(12) United States Patent
Kikuchi

(10) Patent No.: US 9,178,617 B2
(45) Date of Patent: Nov. 3, 2015

(54) OPTICAL MULTILEVEL SIGNAL PRE-EQUALIZATION CIRCUIT, OPTICAL MULTILEVEL SIGNAL PRE-EQUALIZATION TRANSMITTER, AND POLARIZATION-MULTIPLEXED PRE-EQUALIZATION TRANSMITTER

(71) Applicant: HITACHI, LTD., Tokyo (JP)

(72) Inventor: Nobuhiko Kikuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 341 days.

(21) Appl. No.: 13/777,253

(22) Filed: Feb. 26, 2013

(65) Prior Publication Data
US 2014/0147117 A1 May 29, 2014

(30) Foreign Application Priority Data
Nov. 28, 2012 (JP) .................. 2012-259883

(51) Int. Cl.
H04B 10/04 (2006.01)
H04B 10/2513 (2013.01)
H04B 10/2507 (2013.01)
H04B 10/54 (2013.01)

(52) U.S. Cl.
CPC ........ *H04B 10/2513* (2013.01); *H04B 10/2507* (2013.01); *H04B 10/541* (2013.01); *H04B 2210/254* (2013.01)

(58) Field of Classification Search
CPC ........... H04B 10/2507; H04B 10/2513; H04B 10/541; H04B 2210/254
USPC .......................................... 398/182–201, 65
See application file for complete search history.

(56) References Cited

U.S. PATENT DOCUMENTS

| | | | | |
|---|---|---|---|---|
| 5,778,029 A * | 7/1998 | Kaufmann | ................... | 375/296 |
| 7,376,358 B2 * | 5/2008 | Roberts et al. | ................ | 398/193 |
| 7,676,161 B2 * | 3/2010 | Roberts et al. | ................ | 398/194 |
| 7,787,778 B2 * | 8/2010 | Harley et al. | ................. | 398/195 |
| 8,509,347 B2 * | 8/2013 | Kim et al. | .................... | 375/296 |

(Continued)

FOREIGN PATENT DOCUMENTS

WO    2010061784 A1    6/2010

OTHER PUBLICATIONS

Killey et al, Electronic Dispersion Compensation by Signal Predistortion Using Digital Processing and a Dual Drive Mach Zehnder Modulator, Mar. 2005, IEEE, vol. 17 No. 3, pp. 714-716.*

(Continued)

*Primary Examiner* — Ken Vanderpuye
*Assistant Examiner* — Dibson Sanchez
(74) *Attorney, Agent, or Firm* — Mattingly & Malur, PC

(57) ABSTRACT

In order to reduce the circuit size for a chromatic dispersion pre-equalization operation, an optical multilevel signal pre-equalization circuit is provided with: (1) a plurality of look-up tables in which a string of middle codes utilizing a symmetry of a signal constellation of a multilevel code or a string of middle codes represented by polar coordinates is stored in association with a waveform response component; and (2) one or more operation circuits to which the waveform response component corresponding to a multilevel signal to be transmitted is inputted from the plurality of look-up tables, and which outputs a pre-equalized output waveform corresponding to the multilevel signal by operating the waveform response components outputted from different look-up tables.

11 Claims, 22 Drawing Sheets

Configuration of optical multi-level pre-equalization transmitter in this invention

(56) References Cited

U.S. PATENT DOCUMENTS

| | | | |
|---|---|---|---|
| 8,879,925 B2* | 11/2014 | Akiyama et al. | 398/193 |
| 8,909,061 B1* | 12/2014 | Varadarajan | 398/159 |
| 9,014,568 B2* | 4/2015 | Qian et al. | 398/159 |
| 2004/0197103 A1 | 10/2004 | Roberts et al. | |
| 2006/0024062 A1* | 2/2006 | Jakober et al. | 398/141 |
| 2006/0127102 A1* | 6/2006 | Roberts et al. | 398/182 |
| 2008/0050125 A1* | 2/2008 | Essiambre et al. | 398/193 |
| 2008/0232820 A1* | 9/2008 | Burchfiel | 398/183 |
| 2009/0238580 A1 | 9/2009 | Kikuchi | |
| 2009/0257755 A1* | 10/2009 | Buelow | 398/184 |
| 2009/0274469 A1* | 11/2009 | Yuki et al. | 398/152 |
| 2010/0046958 A1* | 2/2010 | Awadalla et al. | 398/149 |
| 2010/0111531 A1* | 5/2010 | Tanimura et al. | 398/65 |
| 2010/0284695 A1* | 11/2010 | Lin | 398/81 |
| 2011/0236033 A1 | 9/2011 | Kikuchi | |
| 2011/0255876 A1* | 10/2011 | Sugihara et al. | 398/188 |
| 2012/0134676 A1* | 5/2012 | Kikuchi | 398/65 |
| 2012/0201546 A1* | 8/2012 | Mizuochi et al. | 398/147 |
| 2012/0301157 A1* | 11/2012 | Qian et al. | 398/192 |

OTHER PUBLICATIONS

Griffin, R. A., et al.; "10Gb/s Optical Differential Quadrature Phase Shift Key (DQPSK) Transmission using GaAs/AlGaAs Integration"; OFC2002; paper PD-FD6; 2002.

Kikuchi, N. et al.; "Highly-sensitive Optical Multilevel Transmission of arbitrary QAM (Quadrature-Amplitude Modulation) Signals with Direct Detection"; J. of Lightwave Technology; vol. 28; No. 1; 2010; pp. 123-130.

Winzer, P. J. et al.; "Spectrally Efficient Long-Haul Optical Networking Using 112-Gb/s Polarization-Multiplexed 16QAM"; Journal of Lightwave Technology; vol. 28; No. 4; Feb. 15, 2010; pp. 547-556.

Kikuchi, N. et al.; "Phase-Noise Tolerant Coherent Polarization-Multiplexed 16QAM Transmission with Digital Delay-Detection"; Proceeding of ECOC 2011; Geneva, Switzerland; Sep. 2011; Tu.3.A.5.

Killey, R., "Dispersion and nonlinearity compensation using electronic predistortion techniques," Optical Fibre Communications and Electronic Signal Processing, 2005, The IEE Seminar.

European Search Report received in European Application No. 13156717 dated Mar. 24, 2014.

* cited by examiner

Definition of amplitude r(n) and phase $\phi_i$

Quadrature phase-shift keying (QPSK)

16QAM signal

Phase pre-integrated signal of Fig.1C

Configuration of conventional pre-equalization multilevel transmitter

Conventional optical pre-equalization transmitter
with conventional phase pre-integration circuit Example configuration of conventional phase pre-integration circuit 16QAM signal of an example in Fig.3A Phase pre-integrated signal of Fig.4A Optical pre-equalization transmitter with conventional
look-up table-based pre-equalization circuit

| Address: n bit | Data at 2i | | Data at 2i-1 | |
|---|---|---|---|---|
| $d_{i-n+1}, \ldots, d_{i-1}, d_i$ | $I_{2i}$ | $Q_{2i}$ | $I_{2i-1}$ | $Q_{2i-1}$ |
| 0 0 0 0 0 0 0 0 | AF | 4F | 10 | 4C |
| 0 0 0 0 0 0 0 1 | AB | 4B | 21 | 0B |
| 0 0 0 0 0 0 1 0 | C0 | 20 | 22 | 3B |
| ⋮ | | | | |
| 1 0 1 1 0 0 1 0 | 30 | 08 | 28 | 28 |
| 1 0 1 1 0 0 1 1 | 33 | 0A | 37 | 7A |
| | | | | |
| | | | | |
| | | | | |
| ⋮ | | | | |
| 1 1 1 1 1 1 1 1 | 02 | 03 | 42 | 6D |

Example configuration of conventional look-up table-based pre-equalization circuit 152

Configuration of optical multi-level pre-equalization transmitter in this invention Example configuration of a middle-code encoder 201 in this invention

Fig. 8A

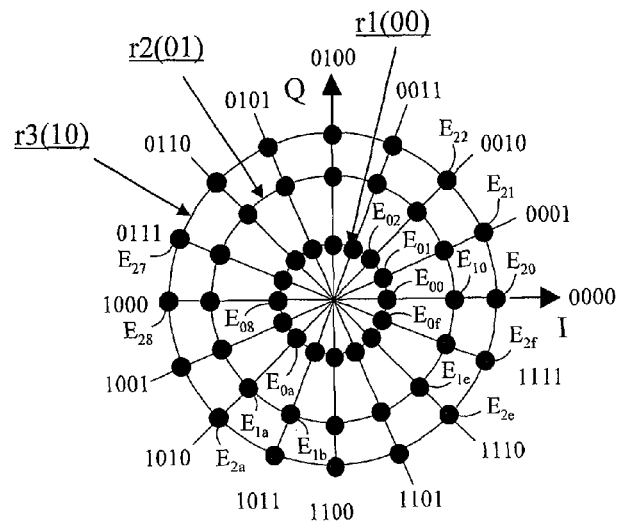

Correspondence of middle-code index and complex coordinate E of each signal point

Fig. 8B

| Middle code: 6 bit | | | | LUT Ak (205-k) | | LUT Bk (204-k) | |
|---|---|---|---|---|---|---|---|
| r | p | | Hex | I | Q | I | Q |
| 0 0 | 0 0 0 0 | | 00 | real($w_k*E_{00}$) | imag($w_k*E_{00}$) | real($v_k*E_{00}$) | imag($v_k*E_{00}$) |
| 0 0 | 0 0 0 1 | | 01 | real($w_k*E_{01}$) | imag($w_k*E_{01}$) | real($v_k*E_{01}$) | imag($v_k*E_{01}$) |
| 0 0 | 0 0 1 0 | | 02 | real($w_k*E_{02}$) | imag($w_k*E_{02}$) | real($v_k*E_{02}$) | imag($v_k*E_{02}$) |
| ⋮ | | | | | | | |
| 0 1 | 1 0 1 0 | | 1a | real($w_k*E_{1a}$) | imag($w_k*E_{1a}$) | real($v_k*E_{1a}$) | imag($v_k*E_{1a}$) |
| 0 1 | 1 0 1 1 | | 1b | real($w_k*E_{1b}$) | imag($w_k*E_{1b}$) | real($v_k*E_{1b}$) | imag($v_k*E_{1b}$) |
| ⋮ | | | | | | | |
| 1 0 | 1 1 1 1 | | 2f | real($w_k*E_{2f}$) | imag($w_k*E_{2f}$) | real($v_k*E_{2f}$) | imag($v_k*E_{2f}$) |

Example configuration of sub look-up tables 204-k and 205-k

Example of a second middle code

| 2nd-code | LUT Ck (210-k) | |
|---|---|---|
| | I | Q |
| a (00000) | real($w_k*E_a$) | imag($w_k*E_a$) |
| b (00001) | real($w_k*E_b$) | imag($w_k*E_b$) |
| c (00010) | real($w_k*E_c$) | imag($w_k*E_c$) |
| ⋮ | | |
| h (00111) | real($w_k*E_h$) | imag($w_k*E_h$) |
| i (01000) | real($w_k*E_i$) | imag($w_k*E_i$) |
| ⋮ | | |
| w (11000) | real($w_k*E_w$) | imag($w_k*E_w$) |

Example configuration of an internal look-up table 210-k

| $r_1, r_2$ | Ratio |
|---|---|
| 0 0 | 5/16 |
| 0 1 | 10/16 |
| 1 0 | 16/16 |

Example setting of a multiplication constant

Example configuration of a constant-number multiplier 230

Relation of multi-level mid code and amplitude ration

Fig. 16B

| 2nd-code | LUT Ck (210-k) | |
|---|---|---|
| | I | Q |
| a (000) | real($w_k * E_a$) | imag($w_k * E_a$) |
| b (001) | real($w_k * E_b$) | imag($w_k * E_b$) |
| c (010) | real($w_k * E_c$) | imag($w_k * E_c$) |
| d (011) | real($w_k * E_d$) | imag($w_k * E_d$) |
| e (100) | real($w_k * E_e$) | imag($w_k * E_e$) |
| f (101) | real($w_k * E_f$) | imag($w_k * E_f$) |
| g (110) | real($w_k * E_g$) | imag($w_k * E_g$) |
| h (111) | real($w_k * E_h$) | imag($w_k * E_h$) |

Example configuration of an internal look-up table 205

Fig. 18

| Address: 6 bit | | | even:2i | | odd:2i-1 | |
|---|---|---|---|---|---|---|
| $r_1, r_2, \phi_1, \phi_2, \phi_3, \phi_4$ Hex | Out | I | Q | I | Q |
| 0 0 0 0 0 0   00 | 1 | $real(w_1*E_{00})$ | $imag(w_1*E_{00})$ | $real(v_1*E_{00})$ | $imag(v_1*E_{00})$ |
|  | 2 | $real(w_2*E_{00})$ | $imag(w_2*E_{00})$ | $real(v_2*E_{00})$ | $imag(v_2*E_{00})$ |
|  | 3 | $real(w_3*E_{00})$ | $imag(w_3*E_{00})$ | $real(v_3*E_{00})$ | $imag(v_3*E_{00})$ |
|  | ⋮ | | | | |
|  | n | $real(w_n*E_{00})$ | $imag(w_n*E_{00})$ | $real(v_n*E_{00})$ | $imag(v_n*E_{00})$ |

⋮

| 1 0 1 1 1 1   2f | 1 | $real(w_k*E_{2f})$ | $imag(w_k*E_{2f})$ | $real(v_k*E_{2f})$ | $imag(v_k*E_{2f})$ |
|---|---|---|---|---|---|
|  | 2 | $real(w_2*E_{2f})$ | $imag(w_2*E_{2f})$ | $real(v_2*E_{2f})$ | $imag(v_2*E_{2f})$ |
|  | 3 | $real(w_3*E_{2f})$ | $imag(w_3*E_{2f})$ | $real(v_3*E_{2f})$ | $imag(v_3*E_{2f})$ |
|  | ⋮ | | | | |
|  | n | $real(w_n*E_{2f})$ | $imag(w_n*E_{2f})$ | $real(v_n*E_{2f})$ | $imag(v_n*E_{2f})$ |

Example of a middle code

| No. | I | Q |
|---|---|---|
| 0 | real($w_k*E_0$) | imag($w_k*E_0$) |
| 1 | real($w_k*E_1$) | imag($w_k*E_1$) |
| 2 | real($w_k*E_2$) | imag($w_k*E_2$) |
| 3 | real($w_k*E_3$) | imag($w_k*E_3$) |
| 4 | real($w_k*E_4$) | imag($w_k*E_4$) |
| 5 | real($w_k*E_5$) | imag($w_k*E_5$) |
| 6 | real($w_k*E_6$) | imag($w_k*E_6$) |
| 7 | real($w_k*E_7$) | imag($w_k*E_7$) |

Example configuration of LUT-Ak (243-k)

Example of a middle code

| Address | I | Q |
|---|---|---|
| 0 | 1 | 1 |
| 1 | 3 | 1 |
| 2 | 1 | 3 |
| 3 | 5 | 1 |
| 4 | 3 | 3 |
| 5 | 1 | 5 |
| 6 | 5 | 3 |
| 7 | 3 | 5 |

Example configuration of CLUT 250

OPTICAL MULTILEVEL SIGNAL PRE-EQUALIZATION CIRCUIT, OPTICAL MULTILEVEL SIGNAL PRE-EQUALIZATION TRANSMITTER, AND POLARIZATION-MULTIPLEXED PRE-EQUALIZATION TRANSMITTER

CLAIM OF PRIORITY

The present application claims priority from Japanese patent application JP 2012-259883 filed on Nov. 28, 2012, the content of which is hereby incorporated by reference into this application.

BACKGROUND

1. Technical Field

The embodiments discussed herein relate to an optical information transmission technology, such as an optical multilevel signal pre-equalization circuit suitable for transmission and reception of an optical multilevel signal via an optical fiber, an optical multilevel signal pre-equalization transmitter, and a polarization multiplexed pre-equalization transmitter.

2. Related Art

The amount of information that can be transmitted by a single optical fiber (transmission capacity) has been increased to a limit by increasing the number of wavelength channels or the optical signal modulation speed, with the wavelength bandwidth of an optical fiber amplifier having been nearly exhausted. If the transmission capacity of the optical fiber is to be further increased, it is necessary to devise an improved signal modulation system and enable a number of optical signals to be packed in a limited frequency-range, to thereby increase the frequency-range utilization efficiency. For this purpose, utilization of optical multilevel modulation has been considered, and a number of studies have been reported. For example, QPSK (Quadrature Phase Shift Keying) involving four-level phase modulation is reported in R. A. Griffin, et al., "10 Gb/s Optical Differential Quadrature Phase Shift Key (DQPSK) Transmission using GaAs/AlGaAs Integration," OFC2002, paper PD-FD6, 2002 (hereafter referred to as "Non-patent Document 1"). Long-distance transmission of a 16QAM signal using optical delay detection, which is a type of direct detection, is reported in N. Kikuchi and S. Sasaki, "Highly-sensitive Optical Multilevel Transmission of arbitrary QAM (Quadrature-Amplitude Modulation) Signals with Direct Detection," J. of Lightwave Technology, Vol. 28, No. 1, 2010, pp. 123-130 (hereafter referred to as "Non-patent Document 2"). A 16 QAM signal coherent reception system combining polarization multiplexing is reported in P. J. Winzer, "Spectrally Efficient Long-Haul Optical Networking Using 112-Gb/s Polarization-Multiplexed 16-QAM," Journal of Lightwave Technology, Vol. 28, No. 4, Feb. 15, 2010, pp. 547-556 (hereafter referred to as "Non-patent Document 3"). A system such that a sixteen-level optical multilevel signal is coherently received and then subjected to digital delay detection in a receiver for reception is reported in N. Kikuchi, "Phase-Noise Tolerant Coherent Polarization-Multiplexed 16QAM Transmission with Digital Delay-Detection," Proceeding of ECOC 2011, Geneva, Switzerland, September 2011, Tu.3.A.5 (hereafter referred to as "Non-patent Document 4").

FIG. 1 illustrates a complex phase plane (or a complex plane, a phaser plane, or an IQ plane) used for optical transmission, and signal constellations according to various known modulation systems. In FIG. 1, the signal points of the various optical multilevel signals (complex notation of optical field at decision timing) are plotted on the complex phase plane. FIG. 1A illustrates a signal point on the IQ plane. Each signal point can be indicated by complex Cartesian coordinates (IQ-coordinate) or the polar coordinates expressed by the amplitude $r(n)$ and the phase $\phi(n)$ as illustrated. FIG. 1B illustrates quarternary phase shift keying (QPSK) in which two bits of information (00, 01, 11, 10) are transmitted with one symbol by using four values $(0, \pi/2, \pi, -\pi/2)$ as the phase angle $\phi(n)$. FIG. 1C illustrates sixteen-level quadrature amplitude modulation (16QAM) which is widely used for wireless applications. In 16QAM, the signal points are arranged in a lattice, and 4-bits of information can be transmitted with one symbol. FIG. 1D illustrates a signal constellation for a 16QAM signal in which a phase pre-integration process, which is a transmitting side signal processing for cancelling the effect of delay detection, is performed by a system described in the aforementioned Non-patent Documents 2 and 4.

Optical delay detection or delay detection in an electric signal stage is a process for detecting a phase difference by causing interference between two chronologically successive symbols, in which the phase component of an output signal from a delay detector represents a phase difference $\Delta\phi$ between the two chronologically successive symbols. Thus, when a multilevel signal such as the 16QAM signal is used, the signal outputted from a receiving side delay detector has a signal constellation with inter-symbol interference which greatly differs from the original multilevel signal. Further, the amplitude component after delay detection represents the product of the amplitudes of the two chronologically successive symbols.

In order to prevent the development of such inter-symbol interference, Non-patent Document 2 introduces a phase pre-integration process. This is a process for integrating the phase of an optical signal on the transmitting side in advance on a symbol by symbol basis. The process involves substituting the phase of a signal with $\Sigma\phi(n)$ without changing the signal amplitude $r(n)$, $\phi(n)$ being the phase of each symbol.

The signal constellation for the 16QAM signal after the phase pre-integration process greatly differs from the original signal constellation, as illustrated in FIG. 1D. However, the phase pre-integration (phase adding process) and the delay detection (phase differential) process in the receiver cancel each other such that the phase component of the signal outputted from the delay detector becomes identical to the phase component of the original 16QAM signal. Thus, by combining the phase component and a separately detected amplitude component $r(n)$ in the receiver, the signal constellation of the original 16QAM signal illustrated in FIG. 1C can be reproduced. Accordingly, by using the phase pre-integration process on the transmitting side, the multilevel signal of an arbitrary signal constellation can be utilized even when an optical receiver that uses optical delay detection or delay detection in an electric signal stage is used.

Meanwhile, in ultrahigh-speed optical fiber transmission, phenomena related to the optical fiber or parts used, such as chromatic dispersion, polarization mode dispersion, and bandwidth limitation, pose a significant limitation factor against an increase in transmission speed or transmission distance. Chromatic dispersion (CD) is a phenomenon in which light of different wavelengths is transmitted at different speeds in an optical fiber. The optical spectrum of an optical signal that is modulated at high speed contains different wavelength components, and these components arrive at the receiving end at different times due to the influence of dispersion. As a result, the optical waveform after transmission is known to cause large waveform distortion.

In order to avoid the influence of dispersion, a technology referred to as "chromatic dispersion compensation" (which may be hereafter simply referred to as "dispersion compensation") is being considered. According to chromatic dispersion compensation, which is a technique for preventing optical waveform distortion, an optical device with inverse chromatic dispersion characteristics with respect to the optical fiber used in the transmission path is installed in the optical transmitter or the optical receiver so that the chromatic dispersion characteristics of the optical fiber can be cancelled.

Conventionally, approaches that have been considered have involved a dispersion compensation fiber with chromatic dispersion of the opposite sign from the transmission path, an optical interferometer, an optical circuit, an optical fiber grating, and the like. These approaches, however, require an extra cost for the optical device, and the amount of chromatic dispersion or the amount of variation thereof that can be obtained by the optical device is limited. For these reasons, the application of digital signal processing has been considered in recent years.

Optical pre-equalization (pre-distortion) transmission is a system for implementing such optical field equalization by an electric signal process on the transmitting side. According to the system, an optical field waveform such that an inverse function of chromatic dispersion is applied to the field of an optical signal in advance in the transmitter is generated, and the optical field waveform is transmitted in the optical fiber so as to cancel the influence of chromatic dispersion of the optical fiber itself. While the basic concept of the pre-equalization system has been around for several decades, a digital pre-equalization optical transmitter for implementing pre-equalization by high-speed digital signal processing has been proposed in recent years. The details of the technology are discussed in Killey, R., "Dispersion and nonlinearity compensation using electronic predistortion techniques," Optical Fibre Communications and Electronic Signal Processing, 2005, The IEE Seminar on (Ref. No. 2005-11310) (hereafter referred to as "Non-patent Document 5"), for example. The pre-equalization signal processing discussed in the present specification is a rather a broad term, including the processes of spectral narrowing, which is linear filtering required on the transmitting side for optical multilevel transmission, and interpolation.

FIG. 2 illustrates a basic configuration of a conventional pre-equalization optical multilevel transmitter that pre-equalizes the influence of chromatic dispersion. In a conventional optical multilevel transmitter signal processing circuit 100, an input information signal 101 is inputted to a multilevel encoder 102 and converted into a one-sample/symbol multilevel signal string 103 digitally represented on a quadrature complex plane, as in the 16QAM signal (FIG. 1C). Then, a doubling interpolation circuit 104 converts the multilevel signal string 103 into a 2 samples/symbol multilevel signal string 105 by an over-sampling process. The multilevel signal string 105 is inputted to a pre-equalization circuit 106 that pre-equalizes the influence of chromatic dispersion. The pre-equalization circuit 106 superposes an inverse function of the chromatic dispersion characteristics of the transmission path onto the multilevel signal string 105 through a digital pre-equalization process. The real part and the imaginary part of the multilevel signal 107 after pre-equalization are respectively inputted to linear response compensation circuits 108-1 and 108-2 and nonlinear response compensation circuits 109-1 and 109-2. The linear response compensation circuits 108-1 and 108-2 and the nonlinear response compensation circuits 109-1 and 109-2 perform digital signal processing for providing inverse compensation for linear or nonlinear response degradation of a subsequent driver amplifier or optical modulator. The real part and the imaginary part of a digital multilevel signal generated by the signal processing are inputted to DA converters 110-1 and 110-2, respectively, and are thereby converted into high-speed analog modulation signals 111-1 and 111-2, respectively. The analog modulation signals 111-1 and 111-2 are amplified by driver amplifiers 112-1 and 112-2 to desired amplitudes and then inputted to two modulation input terminals (I, Q) of an IQ optical (field) modulator 115. The IQ optical (field) modulator 115 converts CW (continuous wave) laser light 114 outputted from a laser source 113 into an optical multilevel signal 117 that is pre-equalized for chromatic dispersion, and outputs the optical multilevel signal 117 via an output optical fiber 116.

FIG. 3 illustrates a conventional configuration of a pre-equalization optical multilevel transmitter using a phase pre-integration process. The transmitter side of the system transmits an optical multilevel signal while performing a phase pre-integration process. The receiver side of the system subjects the optical multilevel signal to optical delay detection or coherent detection, and then performs delay detection by digital operation so as to alleviate various degradations associated with optical multilevel transmission. The details of the present system are discussed in Non-patent Documents 2 and 4.

The phase pre-integration process is an operational process that cumulatively adds the phase component (angle) of a multilevel signal on a symbol by symbol basis. However, when the phase pre-integration process is applied to a two-dimensional multilevel signal, such as the 16QAM signal, as is, complex operational processes are required, such as (1) a process for converting the signal point positions expressed by Cartesian coordinates to polar coordinates; (2) a process for adding extracted phase information at high accuracy of 8 to 12 bits, for example; (3) a process for conversion to Cartesian coordinates by re-combing the added signal with amplitude. These processes may be resolved by an operational process using a middle code described in WO 2010/061784 A1 (hereafter referred to as "Patent Document 1"). The phase pre-integration process of FIG. 3 will be described in accordance with a configuration disclosed in Patent Document 1.

FIG. 3A illustrates an internal configuration of a signal processing circuit 120 of the conventional phase pre-integration optical multilevel transmitter. In the case of the signal processing circuit 120, an information signal 101 is inputted to an encoder 121 that uses a middle polar coordinate code, by which the information signal 101 is converted into a polar coordinate multilevel middle code (amplitude N states, phase M states) 122. The polar coordinate multilevel middle code 122 is inputted to a phase pre-integration circuit 123. The phase pre-integration circuit 123 performs a pre-integration operation for sequentially cumulatively adding the middle code of the phase portion, re-combines the middle code with the middle code for the original amplitude portion, and then outputs a middle code (amplitude N states, phase M states) 124 after phase pre-integration. The middle code after phase pre-integration is subjected to Cartesian coordinate conversion by a Cartesian coordinate conversion circuit 125, thereby producing a multilevel signal 126 after phase pre-integration. The subsequent configuration of the transmitter is the same as depicted in FIG. 2, and an optical multilevel signal 127 that has been subjected to phase pre-integration and chromatic dispersion pre-equalization is obtained via the output optical fiber 116.

A first reason for adopting the configuration using the middle code is so that the polar coordinate conversion required for the phase pre-integration process can be omitted by encoding the multilevel signal in polar coordinates from the beginning. A second reason is in order to decrease the amount of subsequent operation by the phase pre-integration circuit 123 or the Cartesian coordinate conversion circuit 125 by significantly limiting the number of states of the multilevel signal (the number of states of amplitude N, the number of states of phase M; N and M being integers on the order of 4 to 32, for example).

FIG. 3B illustrates a conventional configuration of the phase pre-integration circuit 123, in which the inputted polar coordinate multilevel middle code 122 is separated into an amplitude middle code 130 with the number of states N and a phase information signal 131 with the number of states M. The amplitude middle code 130 is delayed by a delay circuit 133-1. The phase information signal 131 is inputted to an integration circuit 132. An adder circuit 136 of the integration circuit 132 adds an inputted phase information signal $\phi_i$ and a phase integrated value $\Sigma\phi_{i-1}$ up to one symbol previously, and outputs the result as a phase information signal 134 after pre-integration ($\Sigma\phi_i$).

The number of states of the phase information signal is M. Thus, the adder circuit 136 can perform the addition by "modulo-M", so that the circuit size required for the adding can be decreased. To the subsequent Cartesian coordinate conversion circuit 125, a multilevel signal with the number of amplitude states N and the number of phase states M is inputted. The Cartesian coordinate conversion circuit 125 may be implemented by using a look-up table (LUT).

FIG. 4A illustrates a 16QAM signal discussed in Patent Document 1 and an example of the middle code thereof. In the present example, the amplitude has three levels, and the phase has sixteen levels. Thus, the amplitude of the middle code is expressed by 2 bits, with 00, 01, and 10 allocated to a minimum value r1, a middle value r2, and a maximum value r3, respectively. The number of states of the phase of the middle code M=16, and the phase of the middle code is expressed by 16 values of 4-bits from 0000 to 1111.

FIG. 4B illustrates a signal constellation after phase pre-integration. In FIG. 4B, the phase state of the 16QAM signal is limited to positions corresponding to integer multiples of $2\pi/16$. The number of phase states before and after phase pre-integration is both M=16. Thus, the middle code with the amplitude of three levels and the phase of sixteen levels can be commonly used before and after phase pre-integration.

FIG. 5 illustrates a configuration in which the conventional chromatic dispersion pre-equalization circuit 106 is implemented by a complex digital FIR (Finite Impulse Response) filter. The complex digital FIR filter 140 is a circuit in which complex delay circuits 141, complex tap multipliers 142, and adders 143 are arranged in ladder form. The response characteristics of the complex tap multipliers 142 are set at $d^{-1}$ (t), which is the impulse response of an inverse function $D^{-1}$ (f) of the chromatic dispersion of transmission path. The complex tap multipliers 142 implements a pre-equalization function that convolves the impulse response $d^{-1}$ (t) with the two-samples/symbol multilevel signal string 105 that has been inputted.

However, this configuration requires one complex multiplier per tap (which is equivalent to four real number multipliers). Further, in this configuration, when the transmission distance is long and the influence of chromatic dispersion is increased, it becomes necessary to take longer impulse response d(t), resulting in the problem that the amount of operation (i.e., circuit size) drastically increases in proportion to the amount of chromatic dispersion.

For example, when the symbol speed of the optical multi-level signal is 28 G symbols/s, the sampling speed of digital signal processing is twice that, i.e., 56 G samples/s, and the transmission distance of the optical fiber is 100 km (with the amount of chromatic dispersion of 1700 ps/nm for normal dispersion fiber), the optical pulse energy amount due to chromatic dispersion in a signal bandwidth of ±56 GHz is about 761 ps=8 symbols. The required number of taps for the FIR filter in this case is twice as many, i.e., 16 taps. Although the number of taps may appear small, the operation speed of an IC circuit for performing these operational processes is on the order of no more than several 100 MHz. Thus, when the FIR filter is configured from 200 or so parallel operations, the number of required real number multipliers will be 16×4×200=12800, thus requiring a very large-sized complex operation circuit.

As a method for alleviating the problem of an increase in circuit size, the pre-equalization circuit for chromatic dispersion may be configured from look-up tables, as illustrated in FIG. 2 of Non-patent Document 5. In the pre-equalization circuit, an ideal optical multilevel signal prior to transmission can be used as an input signal. Further, by utilizing the look-up tables, circuit size can be greatly decreased because the number of states of the field signal that is inputted can be greatly decreased. Namely, assuming a general complex field input, the input field signal would have a number of states on the order of 16 bits of 8 bits for real part and 8 bits for imaginary part (corresponding to 65536 states). However, when the ideal binary field signal prior to transmission is inputted, for example, one bit for mark and space would suffice, so that the circuit size can be decreased to 1/65536. Accordingly, the pre-equalization circuit can be configured by using a memory circuit of a relatively small size.

FIG. 6A illustrates a configuration of such a conventional pre-equalization transmitter. The pre-equalization transmitter includes an optical multilevel transmitter signal processing circuit 150 that uses a look-up table type pre-equalization circuit for pre-equalization of the chromatic dispersion of a binary or multilevel optical signal for transmission. When the information signal 101 to be transmitted is a bit string $d_i$, the input signal is inputted to a buffer circuit (FIFO: First In First Out) 151 in which $d_i$ is extracted from a data string $d_{(i-n+1)}$ for n symbols and inputted to the look-up table type pre-equalization circuit 152.

The look-up table type pre-equalization circuit 152 is provided with an over-sampling process and outputs two time sample points per symbol for two sets of interpolation samples of times 2i and 2i+1, for example, as a complex field signal (two sets of digital data for real part and imaginary part). The reason that the look-up table type pre-equalization circuit 152 can be used is that, when the time length of the digital complex FIR filter is n symbols (the number of taps is 2n when the over-sampling coefficient is two), the waveform of the output complex optical signal of the times 2i and 2i+1 is uniquely determined only by the input data for the n symbols immediately preceding the times. Namely, the same function as an FIR filter can be implemented by creating a look-up table with the output waveforms for the two times as values by using the data for the immediately preceding n symbols as addresses.

FIG. 6B illustrates a configuration of the look-up table type pre-equalization circuit 152 in a case where the input signal $d_i$ is a binary signal. A data string $d_{i-n+1}$ to $d_i$ for n bits that have been inputted is utilized as addresses for the n bits, and the real part and the imaginary part of data for timings 2i and 2i+1 are each stored as 8-bit data. In the present example, the size of the look-up table type pre-equalization circuit 152 is ($2^n \times 4$) bytes. For example, when n=10, the circuit size of the look-up table type pre-equalization circuit 152 only needs to be on the order of as small as 128 bytes. Further, Non-patent Document 5 discusses a configuration such that the look-up table type pre-equalization circuit 152 includes the function of correcting a nonlinear response of the IQ optical (field) modulator 115 or a bandwidth response of a driver circuit.

SUMMARY

However, the conventional pre-equalization signal processing circuit that uses an FIR filter or look-up tables has the problem that the circuit size is greatly increased. As described above, the size of the FIR filter or the look-up table is proportional to the impulse response length to be compensated. Namely, as the transmission distance or modulation speed is increased and the sample length influenced by chromatic dispersion becomes longer, the number of required multipliers (circuit size) sharply increases correspondingly. Such an increase in circuit size is also problematic when a sharp Nyquist filter with a high bandwidth narrowing ratio is to be implemented.

Thus, the complex field signal inputted to the FIR filter for performing a digital process on the transmitting side is generally a chronological sample string that has been over-sampled with a factor of 2 or more. Accordingly, the number of taps and the amount of operation increase in accordance with the over-sampling ratio. Further, the symbol speed for high-speed optical transmission is on the order of 10 to several 10 Gbaud, so that, when the above circuit is implemented in a realistic LSI, such as a FPGA or an ASIC, the internal number of parallels needs to be increased in accordance with the internal operation speed (normally on the order of several 100 MHz). Namely, the number of the required multipliers will be 100 to 200 times as many as the above. Thus, circuit size reduction is a major practical problem.

The pre-equalization circuit is a part that requires a particularly large amount of signal processing among the digital signal processing for an optical multilevel transmitter, and therefore the circuit size of the pre-equalization circuit poses a practical bottleneck. When the circuit size is increased, the amount of heat generated by the optical transmitter-receiver using an LSI including the present circuit or the present LSI, and hence power consumption thereof, are proportionally increased. As a result, practicability and the maximum packaging density are decreased, thus greatly detracting from the commercial value of the transmitter-receiver. In addition, an increase in LSI size directly leads to an increase in the LSI manufacturing cost.

Also, when the pre-equalization circuit is implemented with a look-up table, application to a multilevel signal poses a large problem. In the case of binary transmission with a small number of signal states, when the impulse response length (channel length) required for pre-equalization is N symbols, the required number of addresses for the look-up table is $2^N$. However, when a multilevel signal with the number of states M is used as an input, the required number of addresses sharply increases to $M^N$. For example, while the required number of addresses for the look-up table for a channel response length corresponding to 10 symbols is $2^{10}=1000$ in the case of binary transmission, simply switching to sixteen-level transmission would drastically increase the number of addresses to $16^{10}=1.1\text{ e}12=1.1$ trillion, which makes it virtually impossible to implement the look-up table.

Further, in an optical transmitter in which phase pre-integration is performed, as in the conventional example, it is necessary to bring the signal constellation back to Cartesian coordinates after the operation for phase pre-integration is performed in the polar coordinate system, which also results in an increase in circuit size.

Thus, the present invention provides an optical multilevel signal pre-equalization circuit such that the circuit size for the pre-equalization operation for chromatic dispersion is decreased, whereby the size and cost for a transmitter as well as power consumption thereof can be decreased, and increased practicability can be obtained.

The present invention solves various problems encountered in a digital equalization process for a multilevel signal in a transmitter. For example, the present invention solves problems related to compensation of frequency characteristics of electric and optical parts used in the transmitter, to transmission impairment compensation on a transmitting side including a nonlinear effect of an optical fiber transmission path, to spectrum shaping represented by Nyquist filtering, waveform shaping by RZ or NRZ format, or to a waveform interpolation process.

In order to solve the aforementioned problems, according to an embodiment, an optical multilevel signal pre-equalization circuit is provided with: (1) a plurality of look-up tables in which a string of middle codes utilizing a symmetry of a signal constellation of a multilevel code, or a string of middle codes represented by polar coordinates is stored in association with a waveform response component; and (2) one or more operation circuits to which the waveform response component corresponding to a multilevel signal to be transmitted is inputted from the plurality of look-up tables, and which outputs a pre-equalized output waveform corresponding to the multilevel signal by performing an operation on the waveform response components outputted from different look-up tables.

EFFECTS OF THE INVENTION

According to an embodiment, a string of middle codes utilizing symmetry in a broad sense is inputted to a look-up table, whereby an optical multilevel signal pre-equalization circuit with a smaller circuit size compared to a conventional system can be implemented. Other problems, configurations, and effects may become apparent from the following description of embodiments.

BRIEF DESCRIPTION OF DRAWINGS

FIGS. 7A and 7B illustrate an optical multilevel signal pre-equalization transmitter according to a first embodiment;

FIGS. 8A and 8B illustrate a multilevel middle code and sub look-up tables according to the first embodiment;

FIGS. 16A and 16B illustrate a multilevel middle code and an internal look-up table according to the third embodiment;

FIG. 18 illustrates a sub look-up table according to the fourth embodiment;

DESCRIPTION

Figure 1A:
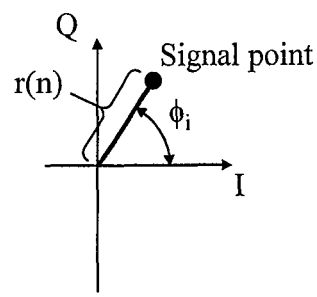
FIGS. 1A to 1D illustrate a method of displaying an optical field signal and signal points for an optical multilevel modulation system (conventional example)
Figure 1B:
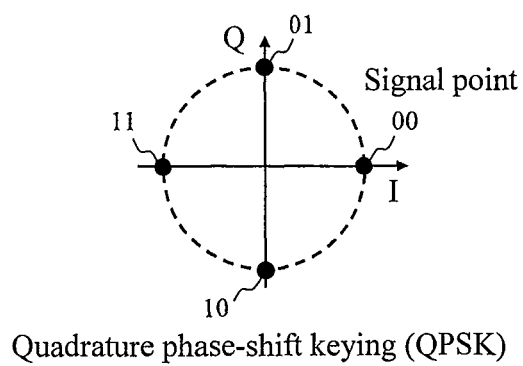
Figure 1C:
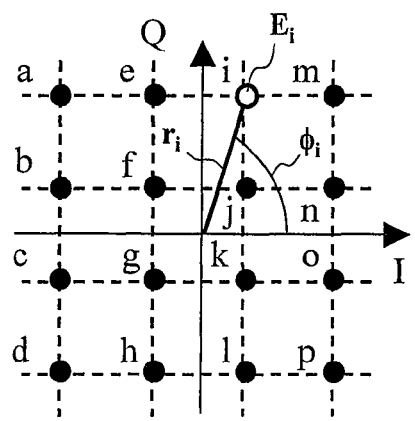
Figure 1D:
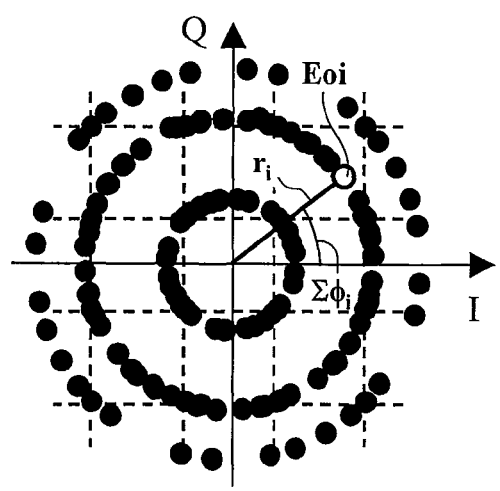
Figure 2:
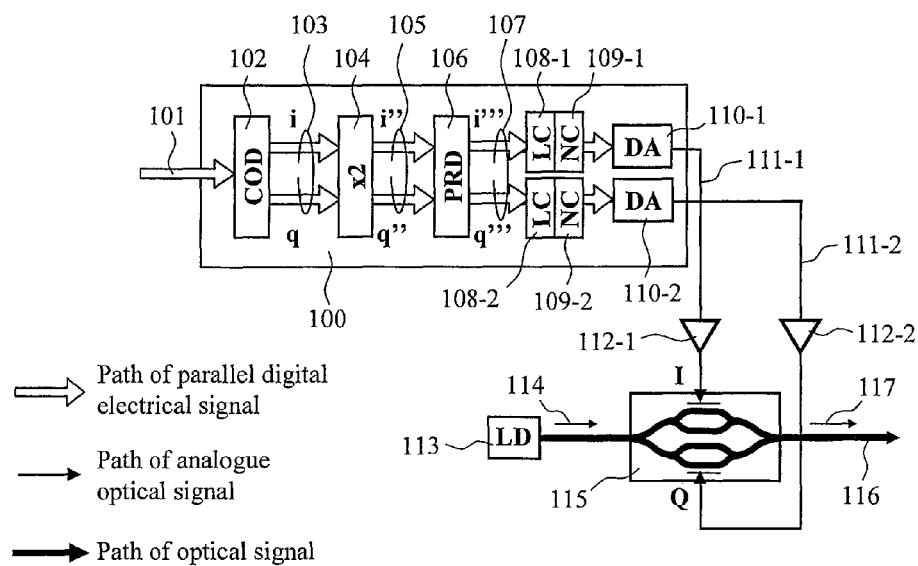
FIG. 2 illustrates a chromatic dispersion pre-equalization optical multilevel transmitter (conventional example)

In the following, embodiments of the present invention will be described with reference to the drawings. The mode of carrying out the present invention is not limited to the following embodiments, and various modifications or variations may be made within the scope of the technical concept of the invention.
(Overview)

An embodiment described below is related to an optical multilevel signal pre-equalization circuit including a plurality of look-up tables and one or more complex operation circuits. The look-up tables is supplied with a middle code string as an input such that a multilevel signal to be transmitted is converted into an arrangement different from a transmission multilevel code used by the multilevel signal. The look-up tables contain waveform response components for respective middle codes. In the optical multilevel signal pre-equalization circuit, the middle code string, which is a conversion of the multilevel signal to be transmitted to an arrangement different from the transmission multilevel code, is inputted to the look-up tables, and a response component obtained as an output and a response component obtained from another look-up table as an output are subjected to a complex operation so as to obtain a pre-equalized output waveform.

An embodiment is related to an optical multilevel signal transmitter including the optical multilevel signal pre-equalization circuit and an optical field modulator that converts the pre-equalized waveform into a complex optical field as an output. The optical multilevel signal transmitter inputs the pre-equalized waveform corresponding to the multilevel signal to be transmitted to the optical field modulator in the optical multilevel signal pre-equalization circuit, converts the pre-equalized waveform into a pre-equalization optical field signal, and transmits the pre-equalization optical field. An embodiment is also related to a polarization multiplexed optical pre-equalization transmitter including two of the optical multilevel signal transmitters which are combined such that transmission capacity is increased by polarization-multiplexing or polarization-encoding the respective output optical signals into an output.

The reduction in circuit configuration can be achieved particularly effectively when a polar coordinate middle code combining an amplitude component and a phase component is used as the middle code. The polar coordinate middle code may be used, for example, when, in order to perform optical delay detection or digital delay detection on the reception side, a middle code string such that the phase component of the multilevel signal is pre-integrated on a symbol by symbol basis is used.

By implementing the optical multilevel pre-equalization signal thus generated in combination with a coherent light receiver that receives the signal, a practical optical transponder can be obtained. Further, in the case of an optical transmitter such that phase pre-integration and pre-equalization of an optical multilevel signal are performed by using the middle code, a practical configuration may be such that an optical transponder is configured by implementing the optical transmitter in combination with an optical delay detection receiver or a coherent digital delay detection optical receiver suitable for the reception of the signal.

The optical multilevel signal pre-equalization circuit according to an embodiment is provided with a middle code conversion circuit based on symmetry and a symmetry correction operation circuit, and inputs the middle code or the multilevel signal to be transmitted to the middle code conversion circuit based on symmetry. The middle code conversion circuit converts the input into a middle code from which symmetry is eliminated on the basis of symmetry with respect to a particular complex operation, and a middle code exhibiting symmetry as outputs, and uses only the middle code portion from which symmetry is eliminated as an input to the look-up tables. The response component obtained from the look-up tables is inputted to the symmetry correction operation circuit so as to obtain a pre-equalized waveform by performing a correction operation based on information of the middle code exhibiting symmetry. According to this configuration, the pre-equalization circuit size, i.e., the look-up table size can be decreased. As the symmetry, N-fold rotational symmetry of the middle code or the multilevel signal to be transmitted may be effectively utilized.

Further, when there are many common coordinate values in Cartesian coordinates (IQ-coordinate), such as in the case of a QAM signal, a configuration such that a Cartesian coordinate middle code conversion circuit and a coordinates operation circuit are provided in the optical multilevel signal pre-equalization circuit is adopted. In this case, the middle code or the multilevel signal to be transmitted is inputted to the Cartesian coordinate middle code conversion circuit based on Cartesian coordinate (I, Q) components and thereby converted into a middle code indicating an I-coordinate component and a Q-coordinate component. The middle codes are inputted to the plural look-up tables, and the response component obtained from the look-up tables is inputted to the coordinates operation circuit for operation so as to obtain the pre-equalized waveform. By this approach, the reduction of circuit size can be made more efficient.

The functions of the pre-equalization circuit according to the embodiments described below may include over-sampling by which a waveform is interpolated over time, pre-equalization of the transfer function of chromatic dispersion on the transmitting side, and the making of the optical spectral shape closer to a rectangle for bandwidth reduction. Of these functions, a plurality of functions may be implemented simultaneously.

First Embodiment

Configuration of Optical Multilevel Pre-Equalization Transmitter

FIG. 7A illustrates an embodiment of an optical multilevel pre-equalization transmitter. The optical multilevel pre-equalization transmitter includes an optical multilevel transmitter signal processing circuit 200, a laser source 113, and an IQ optical (field) modulator 115.

The optical multilevel transmitter signal processing circuit 200 is a configuration unique to the present embodiment. In the phase pre-integration optical multilevel transmitter signal processing circuit 120 illustrated in FIG. 3, the three circuits of the Cartesian coordinate conversion circuit 125, the doubling interpolation circuit 104, and the pre-equalization circuit 106 are disposed after the phase pre-integration circuit 123. In the optical multilevel transmitter signal processing circuit 200, these three circuits are substituted with a middle code pre-equalization circuit 201 so that the circuit configuration can be significantly simplified.

The reason that the above simple configuration is possible is that the middle code outputted from the phase pre-integration circuit 123 is not converted into complex coordinates but is inputted to the middle code pre-equalization circuit 201 as is so as to perform a pre-equalization process.

Figure 7B:
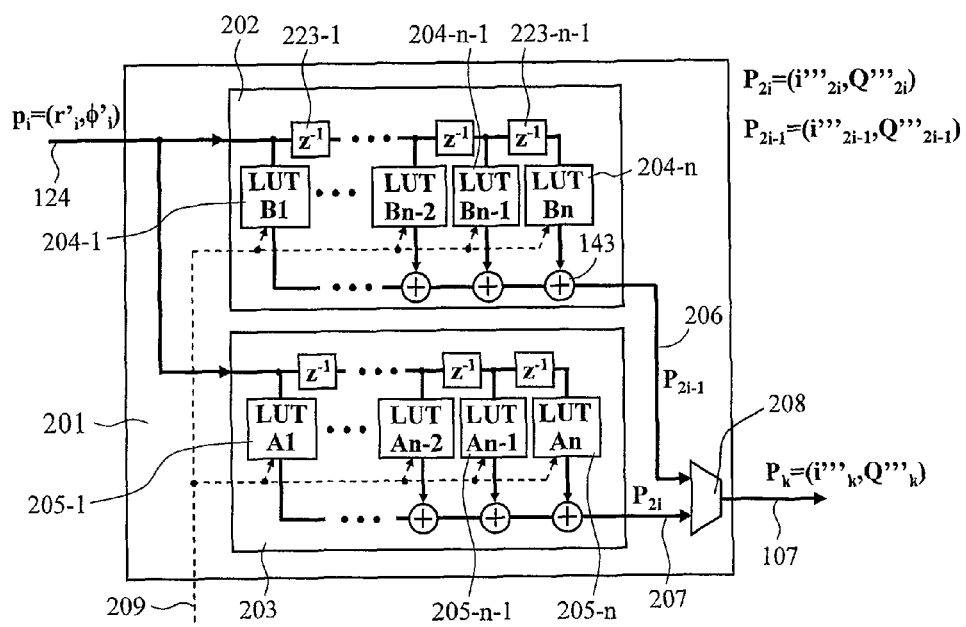

FIG. 7B illustrates a configuration of the middle code pre-equalization circuit 201. The middle code (the number of amplitude states N, the number of phase states M) 124 outputted from the preceding phase pre-integration circuit 123 after phase pre-integration is inputted to the middle code pre-equalization circuit 201, in which the middle code 124 is split into two which are inputted to an odd-sample calculation circuit 202 and an even-sample calculation circuit 203. In the odd-sample calculation circuit 202, the inputted middle code string is inputted to a ladder circuit including odd-sample sub look-up tables 204-1 to 204-$n$ and delay circuits 223-1 to 223-$n$–1. The odd-sample sub look-up tables 204 output single complex data corresponding to the inputted multilevel middle code, and the data is sequentially added by complex adder circuits 143. Thus, a function similar to a complex FIR filter is performed, so that a complex optical field as an output can be calculated.

Figure 3A:
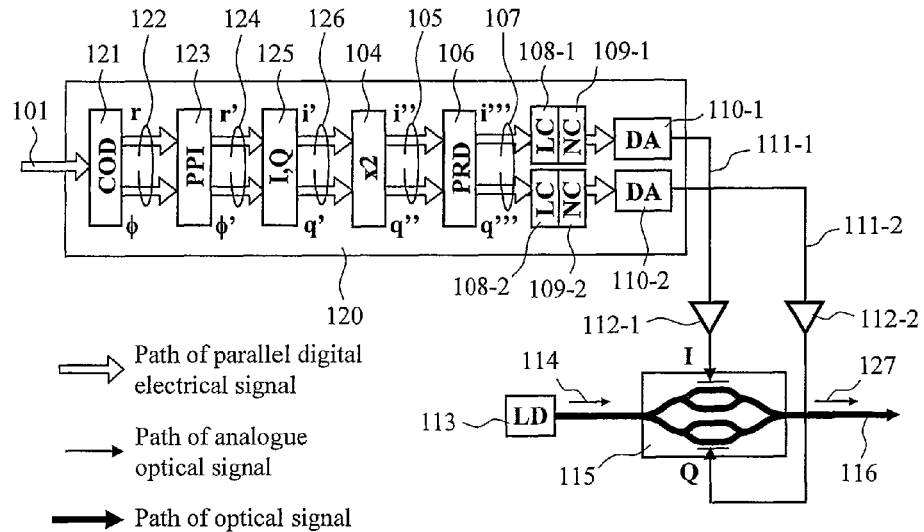
FIGS. 3A and 3B illustrate a chromatic dispersion pre-equalization optical multilevel transmitter that uses phase pre-integration (conventional example)
Figure 3B:
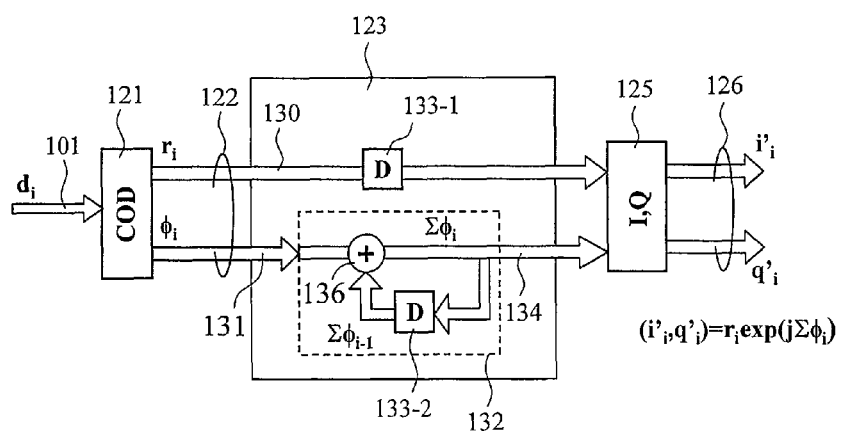

The configuration of the even-sample calculation circuit 203 is the same as the structure of the odd-sample calculation circuit 202. The two, odd- and even-sample calculation circuits are provided so as to double over-sampling of the complex waveform as performed by the doubling interpolation circuit 104 in the conventional configuration (FIG. 3). For example, an odd-number sample is the median value of a complex waveform symbol, and an even-number sample is the boundary value of a complex waveform symbol immediately following the same. The over-sampling that can be implemented in the present configuration is not limited to the two folds. For example, when a K-fold up-sampling is required, a sample calculation circuit that similarly calculates 1st to Kth interpolation samples may be provided.

An odd-sample complex output signal 206 and an even-sample complex output signal 207 calculated as described above are inputted to a multiplexing circuit 208, in which the signals are time-multiplexed in the order of the samples and outputted as a pre-equalized multilevel signal 107.

The calculation circuits 202 and 203 for interpolation samples are arranged in parallel according to the present example so as to achieve the same process result with a smaller circuit size. When a pre-equalization process for a channel response length of n symbols is to be implemented in the configuration of FIG. 7A, K-fold interpolation may be performed prior to the pre-equalization process, as in the conventional example of FIG. 3. In this case, the same function can be implemented with a configuration employing only the odd-sample calculation circuit 202. However, because of the K-fold over-sampling, the operation speed of the middle code pre-equalization circuit 201 as a whole including the odd-sample calculation circuit 202 is increased by K-fold, and the number of the odd-sample sub look-up tables 204 needs to be increased by K-fold, i.e., to Kn, in order to obtain the channel response length for the same n symbols. Because there is an upper limit to the operation speed of the FPGA or LSI implementing the present circuit, the number of parallels of the circuit would have to be increased by K-fold in order to make up for the K-fold increase in operation speed, which would eventually result in a $K^2$-fold increase in circuit size. Compared to the case where only one operator is used for processing, when a parallel configuration is used as in FIG. 7B, it is only necessary to prepare K interpolation-sample-determining calculation circuits that operate at the symbol speed, so that the circuit size can be decreased to 1/K.

The odd-sample sub look-up tables 204-1 to 204-$n$ and the even-sample sub look-up tables 205-1 to 205-$n$ are supplied with a table renewal data signal 209 so that the complex number string stored in each sub look-up table can be renewed to a different value as needed. For example, in chromatic dispersion pre-equalization, the values of the tables may be changed in accordance with distance so as to set the amount of equalization of waveform degradation to an optimum value, or the reception quality obtained on the receiver side may be optimized by sequentially renewing the tables in accordance with distance, whereby automatic startup or optimization of the pre-equalization transmitter can be implemented. Other uses may include modifying the bandwidth or roll-off rate of a waveform bandwidth narrowing filter as needed, or modifying a waveform interpolation filter so as to modify the transmission waveform.

Figure 4A:
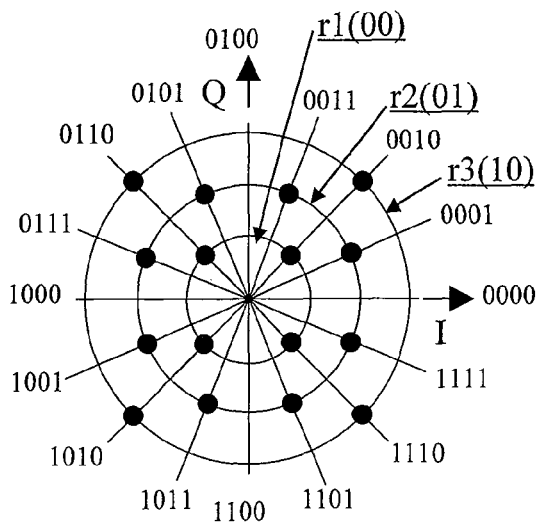
FIGS. 4A and 4B illustrate a 16QAM signal (FIG. 3) and a signal constellation after phase pre-integration thereof (conventional example)
Figure 4B:
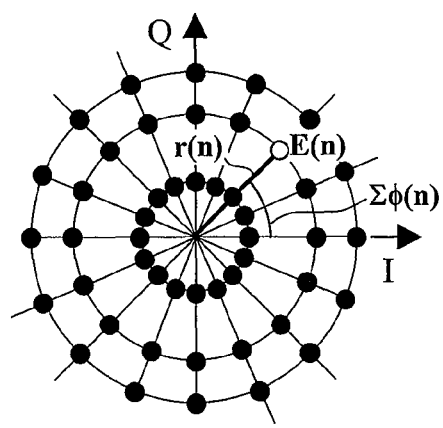
Figure 5:
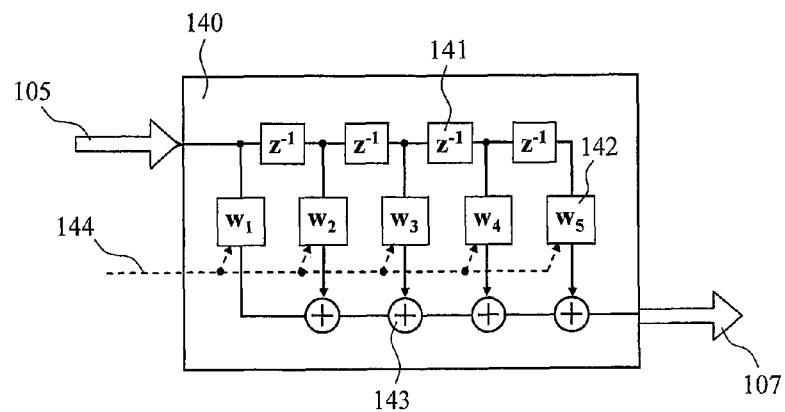
FIG. 5 illustrates a chromatic dispersion pre-equalization circuit 106 that uses a complex digital FIR filter (conventional example)
Figure 6A:
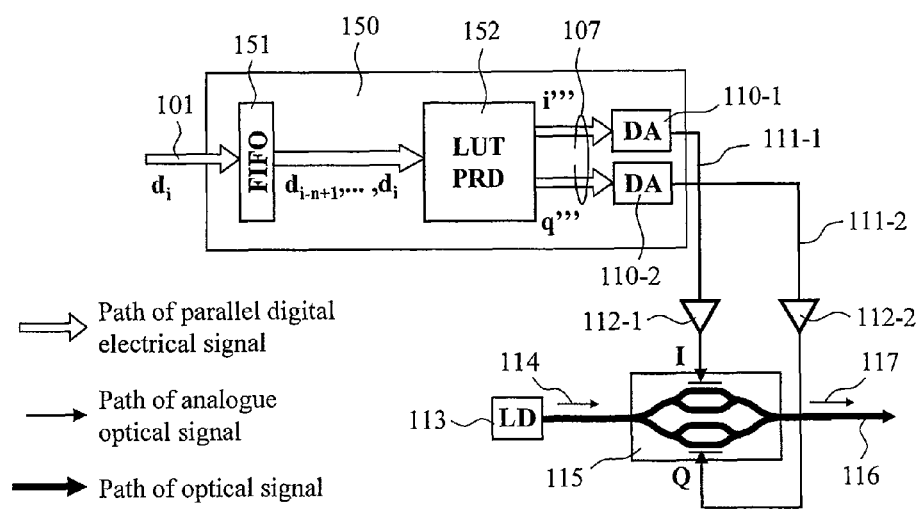
FIGS. 6A and 6B illustrate a pre-equalization transmitter that uses a look-up table (conventional example)
Figure 6B:
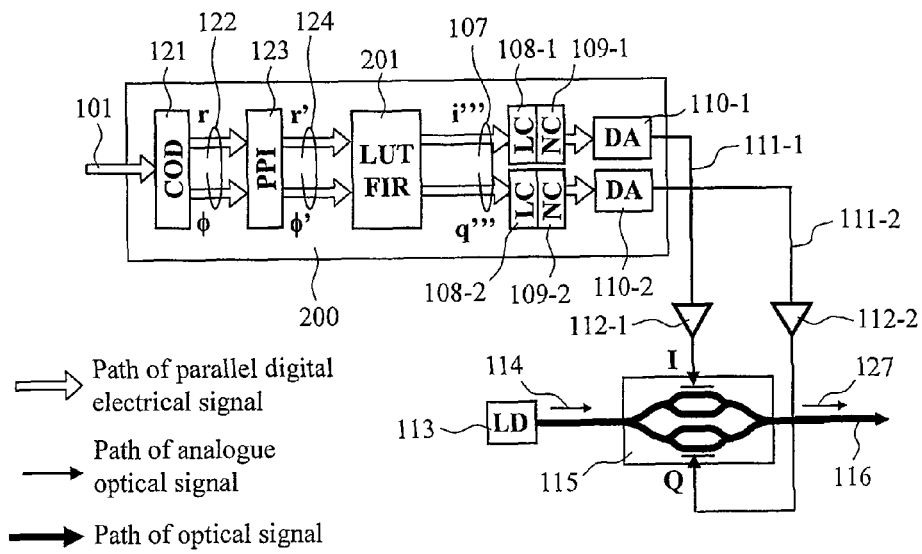

FIG. 8A illustrates a multilevel middle code according to the first embodiment. On the assumption that the middle code 124 as an input after phase pre-integration is the same as in the example of FIG. 4, amplitude is allocated with three (2-bit) middle codes of r1(00), r2(01), and r3(10) arranged in order from the inside, while phase is allocated with 16 (4-bit) middle codes of "0000" to "1111". In the following, for simplicity, the middle codes are denoted in hexadecimal, the amplitude r is denoted by a single digit of 0 to 2, the phase p is denoted by a single-digit hexadecimal of 0 to f, and the respective signal points are expressed as $E_{rp}$, as illustrated in FIG. 8A.

FIG. 8B illustrates sub look-up tables 204-$k$ and 205-$k$ according to the first embodiment. The input to the look-up tables is a 6-bit middle code combining the amplitude r and the phase p. By using this as an index, the real part and imaginary part (normally digital values of the order of 6 to 12 bits) of an output complex number value are stored in each of the sub look-up table 204-k (LUT Ak) and the sub look-up table 205-k (LUT Bk). For example, the digital values stored at the position with phase r and amplitude p are, in the LUT Ak, the real part (real($w_k*E_{rp}$)) and the imaginary part (imag($w_k*E_{rp}$)) of the complex product of a complex tap $w_k$ and the coordinates of a signal point $E_{rp}$, and, in the LUT Bk, the real part (real($v_k*E_{rp}$)) and the imaginary part (imag($v_k*E_{rp}$)) of the complex product of a complex tap $v_k$ and the coordinates of a signal point $E_{rp}$.

As a result, the output signal from the configuration of FIG. 7 is represented by expressions 1 and 2, the result being equivalent to the result of the operation by a complex digital FIR filter.

$$p_{2i-1} = w_1*E_{rp}(i-n+1) + w_2*E_{rp}(i-n+2) + \ldots + w_n*E_{rp}(i) \quad (1)$$

$$p_{2i} = v_1*E_{rp}(i-n+1) + v_2*E_{rp}(i-n+2) + \ldots + v_n*E_{rp}(i) \quad (2)$$

where $E_{rp}(i)$ is the multilevel symbol $E_{rp}$ for time i.

(Configuration of Direct Detection Pre-Equalization Optical Multilevel Transmission System)

Figure 9:
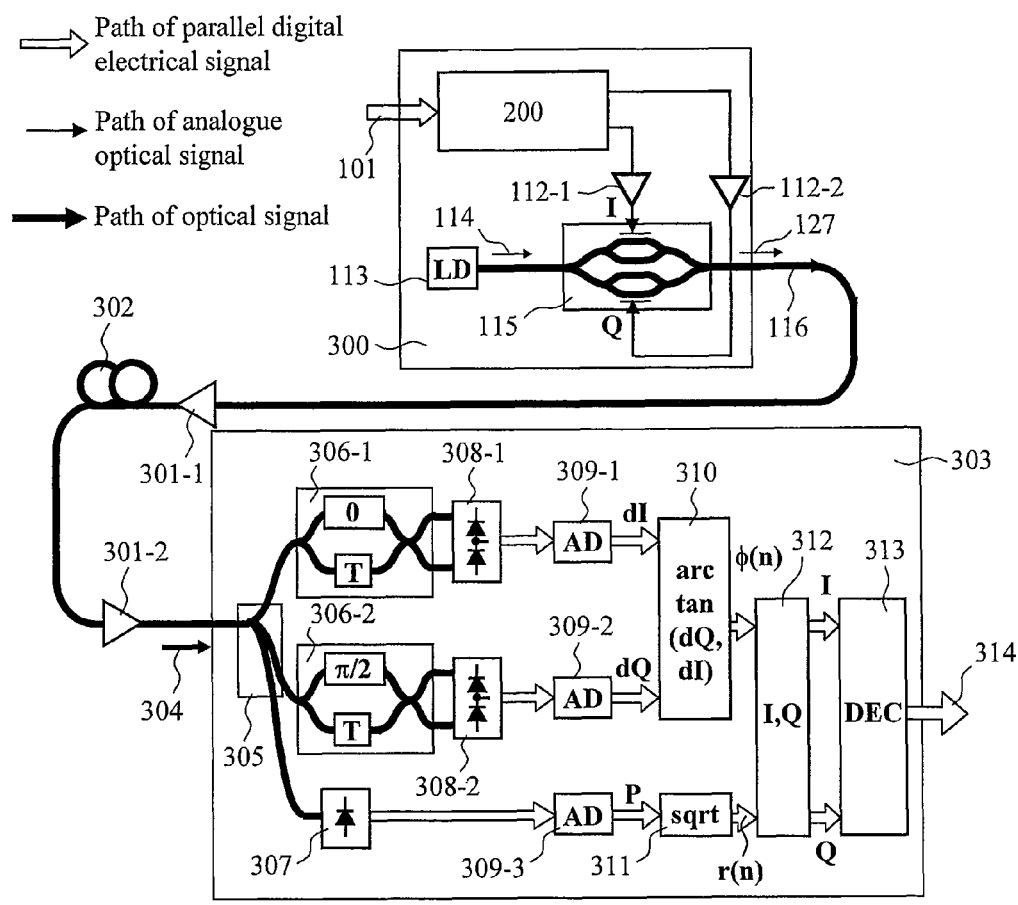
FIG. 9 illustrates a direct detection pre-equalization optical multilevel transmission system according to the first embodiment.

FIG. 9 illustrates a direct detection pre-equalization optical multilevel transmission system according to the first embodiment. The direct detection pre-equalization optical multilevel transmission system includes an optical pre-equalization transmitter 300 and an incoherent optical field receiver 303. The optical pre-equalization transmitter 300 according to the present embodiment includes the optical multilevel transmitter signal processing circuit 200, which outputs a complex field signal by subjecting the input information signal 101 to phase pre-integration and optical pre-equalization. The complex field signal drives the IQ optical (field) modulator 115, whereby the optical multilevel signal 127 that has been subjected to phase pre-integration and chromatic dispersion pre-equalization is obtained.

The optical multilevel signal 127 is amplified by an optical amplifier 301-1 and transmitted via an optical fiber transmission path 302. During transmission, the optical multilevel signal 127 is subjected to waveform degradation due to the chromatic dispersion in optical fiber. Transmission loss of the optical multilevel signal 127 is compensated by an optical amplifier 301-2. The optical multilevel signal 127 after transmission loss compensation is inputted to the incoherent optical field receiver 303 as a reception optical multilevel signal 304. Waveform degradation of the reception optical multilevel signal 304 due to chromatic dispersion is mutually cancelled by the chromatic dispersion pre-equalization process that is applied beforehand in the optical multilevel transmitter signal processing circuit 200.

The incoherent optical field receiver that receives the signal may have a conventional configuration (such as illustrated in Patent Document 1 or Non-patent Document 3). In the following, an example of the configuration will be described. The reception optical multilevel signal 304 is split by an optical splitter 305 into three optical signal paths and inputted to a first optical delay detector 306-1, a second optical delay detector 306-2, and an optical intensity detector 307.

The first optical delay detector 306-1 includes two paths and is set such that the delay time Td for one of the paths is substantially equal to the symbol time T of the received optical multilevel information signal while the optical phase difference between the paths is zero. The second optical delay detector 306-2 includes two paths and is set such that one of the paths has the delay time Td=T while the optical phase difference between the paths is π/2.

Two optical outputs from the first and the second optical delay detectors 306-1 and 306-2 are respectively converted into electric signals by balanced optical receivers 308-1 and 308-2, and the electric signals are respectively converted into digital signals dI(n) and dQ(n) by A/D converters 309-1 and 309-2. An output electric signal from the optical intensity detector 307 is also converted into a digital signal P(n) by an A/D converter 309-3.

Thereafter, the digital signals dI(n) and dQ(n) are inputted to an inverse tangential operation circuit 310. The inverse tangential operation circuit 310 calculates a phase difference Δθ(n) from the immediately preceding symbol. According to the present embodiment, because phase pre-integration is performed on the transmitting side, the output signal from the inverse tangential operation circuit 310 after optical delay detection is $\Delta\theta(n) = \Sigma\phi(n) - \Sigma\phi(n-1) = \phi(n)$, so that the phase component φ(t) of the original complex multilevel information signal can be extracted.

Meanwhile, the digital signal P(n) outputted from the A/D converter 309-3 is inputted to a square-root circuit 311. The square-root circuit 311 outputs an original field amplitude r(n). The amplitude component r(n) and the phase component φ(n) are inputted to a Cartesian coordinate conversion circuit 312, whereby the original complex multilevel information signal prior to phase pre-integration can be recovered. By inputting the signal to a multilevel code decision circuit 313 and making a symbol decision, an output information signal 314 can be reproduced.

(Configuration of Polarization Multiplexed Pre-Equalization Transmitter-Receiver)

Figure 10:
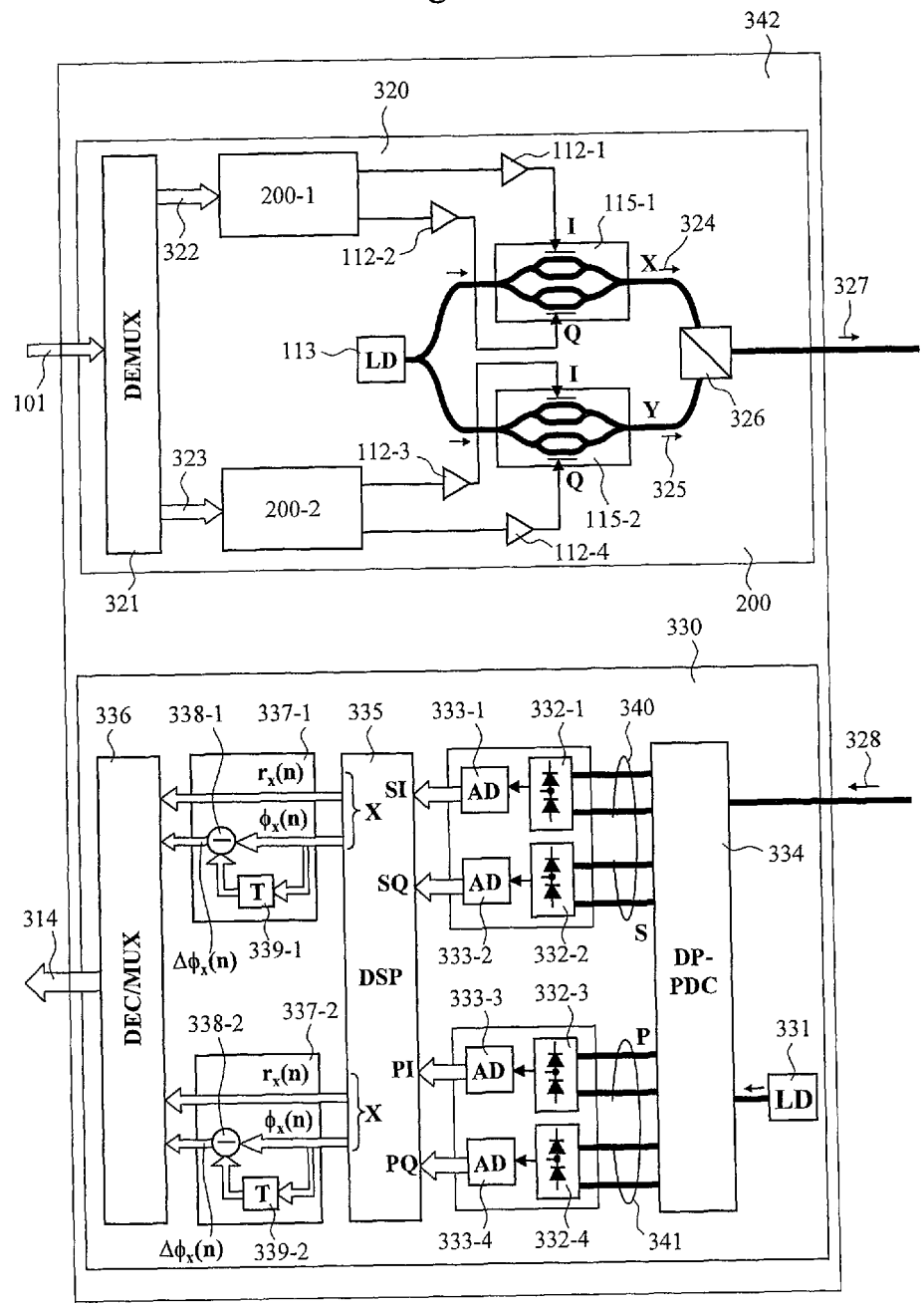
FIG. 10 illustrates a system for digital delay detection and coherent reception pre-equalization optical multilevel transmission according to the first embodiment.

FIG. 10 illustrates a polarization multiplexed optical pre-equalization transmitter-receiver 342 according to the first embodiment. The polarization multiplexed optical pre-equalization transmitter-receiver 342 has a configuration such that a polarization multiplexed optical pre-equalization transmitter 320 according to the embodiment and a polarization diversity coherent optical receiver 330 that employs conventional digital delay detection system are integrated.

In optical fiber communications, a package such that an integral transmitter-receiver (transponder) is disposed, as illustrated in FIG. 10, is widely used. After coherent reception of an input field, the optical receiver of FIG. 10 reproduces a transmission signal by performing delay detection for the reception signal by digital signal processing. The advantages and configuration of the optical receiver of FIG. 10 are similar to the advantages and configuration discussed in Non-patent Document 5.

In the polarization multiplexed pre-equalization optical transmitter 320 according to the embodiment, the laser source 113 outputs CW (continuous wave) laser light, which is split into two and inputted to two IQ optical (field) modulators 115-1 and 115-2. In the case of the present embodiment, the information signal 101 is separated by a separation circuit 321 into an X-polarization information signal 322 and a Y-polarization information signal 323, which are then inputted to the optical multilevel transmitter signal processing circuits 200-1 and 200-2. The optical multilevel transmitter signal processing circuits 200-1 and 200-2 have the same configuration as the optical multilevel transmitter signal processing circuit 200 illustrated in FIG. 7A. In the optical multilevel transmitter signal processing circuits 200-1 and 200-2, the information signal 101 is subjected to a pre-equalization process, such as phase pre-integration and chromatic dispersion.

Output signals from these two signal processing circuits are inputted to driver amplifiers 112-1 to 112-4 and thereby amplified, and are then used as modulation signals for the two IQ optical (field) modulators 115-1 and 115-2. From the IQ optical (field) modulator 115-1, an optical multilevel signal 324 that has been subjected to phase pre-integration and chromatic dispersion pre-equalization with respect to X polarization is obtained. From the IQ optical (field) modulator 115-2, an optical multilevel signal 325 that has been subjected to phase pre-integration and chromatic dispersion pre-equalization with respect to Y polarization is obtained. The optical multilevel signal 324 and the optical multilevel signal 325 are each multiplexed with the other, mutually orthogonal polarization, by a polarization multiplexer 326 into a polarization multiplexed optical multilevel signal 327 which is outputted.

On the other hand, the polarization diversity coherent optical receiver 330 using digital delay detection, which is implemented as the other member of the pair, receives a polarization multiplexed reception multilevel signal 328 that has been modulated in the same way as the polarization multiplexed optical multilevel signal 327.

The polarization diversity coherent optical receiver 330 utilizes output light from a local laser source 331 disposed in the receiver as an optical field and optical phase reference. The polarization-multiplexed reception optical signal 328 is separated by a polarization-diversity optical 90-deg. hybrid circuit 334 into an S-polarization component 340 and a P-polarization component 341, which are received by four balanced optical receivers 332-1, 332-2, 332-3, and 332-4.

The optical frequency of the local laser source 331 disposed in the receiver is set to be substantially the same as the reception optical signal 328. The output light from the local laser source 331 is supplied to a separate input port of the polarization-diversity optical 90-deg. hybrid circuit 334 and then distributed to the balanced optical receivers 332-1, 332-2, 332-3, and 332-4, as is the signal light.

In each of the balanced optical receivers, the input signal light is converted into an electric signal due to interference with local light. The high-speed electric signals outputted from the balanced optical receivers are sampled by corresponding A/D converters 333-1, 333-2, 333-3, and 333-4 and converted into digital signals. The digital signals after conversion are fed to a polarization-diversity frequency/phase estimation circuit 335.

The polarization-diversity frequency/phase estimation circuit 335 performs processes for the input digital signal, such as equalization of transmission path chromatic dispersion or nonlinear effect, and separation of polarization components. As a result, the polarization-diversity frequency/phase estimation circuit 335 outputs an X polarization component and a Y polarization component separately.

These polarization components are inputted to digital delay detection circuits 337-1 and 337-2 for delay detection by a digital numerical operation. In the digital delay detection circuits 337-1 and 337-2, the phase component $\phi(n)$ for the central time of the input signal is extracted and inputted to phase difference operation circuits 338-1 and 338-2. The phase difference operation circuit 338-1 and 338-2 subtract from the inputted phase component $\phi(n)$ a phase component $\phi(n-1)$ which is obtained from delay circuits 339-1 and 339-2 and which precedes by one symbol, whereby the same delay detection effect as from the incoherent optical field receiver 303 of FIG. 9 can be obtained. Namely, as in the case of FIG. 9, the phase pre-integration effect on the transmitting side is cancelled by the effect of phase difference operation by digital delay detection. Thus, the output signals from the digital delay detection circuits 337-1 and 337-2 are identical to the original multilevel signals generated in the optical multilevel transmitter signal processing circuits 200-1 and 200-2, respectively.

The multilevel signal decision circuit 336 performs a decoding process for these multilevel signals and outputs an information signal 314. While not illustrated in the present configuration, generally a framer and an error correction circuit may be disposed in the input/output portion of the transmitter-receiver (transponder).

(Example of Parallel Implementation of Pre-Equalization Circuit)

Figure 11:
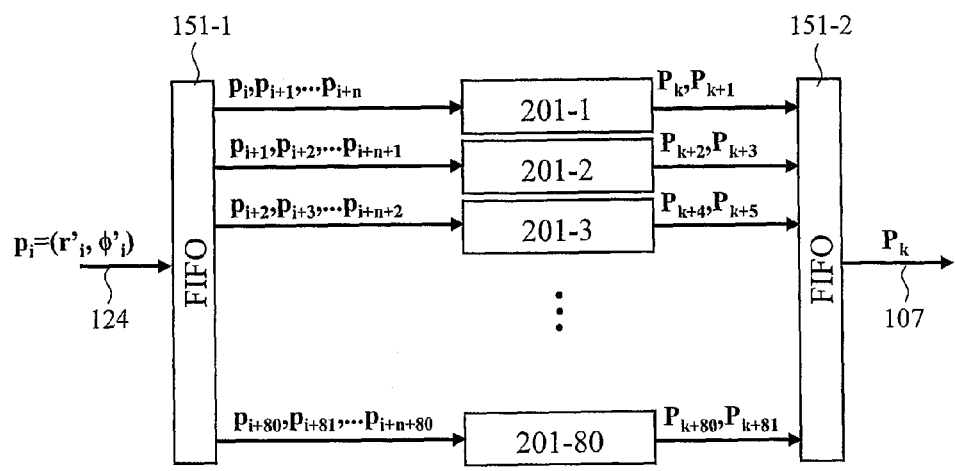
FIG. 11 illustrates an example of parallel implementation of the optical multilevel signal pre-equalization circuit according to the first embodiment.

FIG. 11 illustrates an example of parallel implementation for the pre-equalization circuit 201 according to the first embodiment. The foregoing description has been directed to the configuration such that, as illustrated in FIG. 7A, only one pre-equalization circuit 201 is used in the optical multilevel transmitter signal processing circuit 200. However, for an actual LSI, parallel operation is indispensable. FIG. 11 depicts an implementation in which the channel response length to be equalized has n symbols and the number of parallels is 80.

In the present example, the middle code 124 that is inputted after phase pre-integration is inputted to a buffer circuit (FIFO) 151-1 and then distributed to 80 middle code pre-equalization circuits 201-1 to 201-80 arranged in parallel. By displacing the start point of a string of n symbols that is inputted to each of the middle code pre-equalization circuits 201-1 to 201-80 one by one, sample strings of different times (which are two strings for an odd-sample and an even-sample in the present example) are obtained from the middle code pre-equalization circuits 201-1 to 201-80. These outputs are written to a buffer circuit 151-2, and by reading the outputs one by one in chronological order, a desired parallel operation can be implemented.

Second Embodiment

A second embodiment of the optical multilevel pre-equalization transmitter will be described. While the basic configuration of the present embodiment is similar to the configuration illustrated in FIG. 7A, the circuit size of the middle code pre-equalization circuit 201 is decreased.

Figure 12:
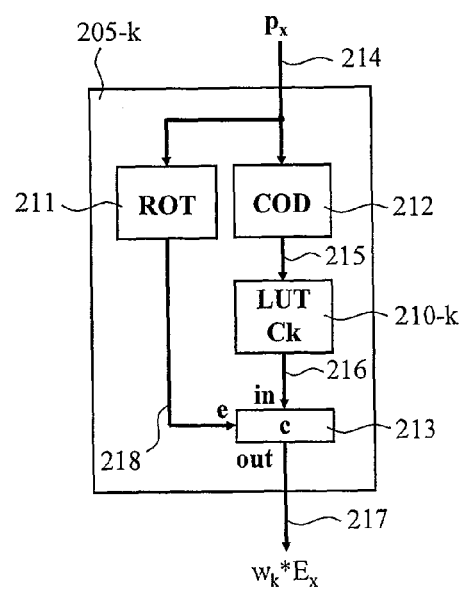
FIG. 12 illustrates a sub look-up table according to a second embodiment.
Figures 13A, 13B:
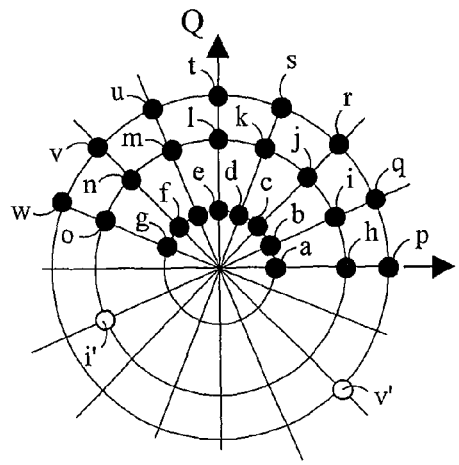
FIGS. 13A and 13B illustrate a second middle code and an internal look-up table.

FIG. 12 illustrates a configuration of a sub look-up table used in the middle code pre-equalization circuit 201 according to the present embodiment. In the configuration of FIG. 12, an even-sample sub look-up table 205-$k$ according to the first embodiment is used for an operation circuit. FIG. 13A illustrates a second middle code used in the even-sample sub look-up table 205-$k$. FIG. 13B illustrates a configuration of an internal look-up table 210-$k$. The configuration of the present embodiment is commonly employed for an odd-sample sub look-up table 204-$k$.

The circuit size of the middle code pre-equalization circuit proposed in the present specification is determined by the size of the look-up table or the number thereof. Thus, the effect of reduction in circuit size can be increased by decreasing table data. Accordingly, according to the present embodiment, the size of the look-up table is decreased to approximately one half the size according to the first embodiment, in consideration of the effect of sign inversion of each middle code.

Referring back to FIG. 12, a middle code 214($p_i$) inputted to the even-sample sub look-up table 205-$k$ is split into two therein. One is inputted to a sign/rotation amount decision circuit 211, while the other is inputted to a second middle code encoder 212.

The sign/rotation amount decision circuit 211 is a circuit that detects the sign from the middle code illustrated in FIG. 8A. The second middle code encoder 212 is a circuit that allocates a new middle code from which the sign or rotation has been eliminated. According to the present embodiment, as the unsigned middle code allocated by the second middle code encoder 212, 24 points in the upper half of the plane illustrated in FIG. 13A may be selected. In this case, a particularly simple implementation can be made. In this case, the sign/rotation amount decision circuit 211 extracts the upper 1-bit of a 4-bit phase middle code as sign information. The second middle code encoder 212 utilizes the lower three bits of the phase middle code and the two bits of the amplitude middle code as is.

According to the present embodiment, because the internal look-up table 210-$k$ has the 24 points depicted in the upper half of the plane of FIG. 13A as the input, the number of addresses can be reduced in half, and the internal look-up table 210-$k$ is implemented as a table with 24 columns, as illustrated in FIG. 13B. The circuit size of FIG. 13B is one half the circuit size of FIG. 8B.

More generally, the second middle code encoder 212 may be configured as an encoder for allocating a completely new second middle code 215 that is rearranged such that a positional relationship $-x=x$ can be satisfied between a sign inversion of a signal point and the signal point. Thus, irrespective of the arrangement or order of the input middle code 214, the reduction of table size by utilizing symmetry according to the present example can be achieved for the middle code of an arbitrary arrangement. An output signal in the case where other points are inputted can be obtained by performing a code correction operation in accordance with the sign/rotational correction signal 218. For example, the signal points i' and v' in FIG. 13A respectively correspond to the points at which the signs of both the I axis and Q axis of signal points i and v are inverted.

The output signal in the case where these signal points are inputted may be obtained by sign inversion of the output signal in the case where the signal points i and v are inputted. This is due to the fact that the complex product of a tap weight $w_k$ and a signal point $E_v'$ written in the sub look-up table illustrated in FIG. 13B has the relationship according to expression (3). Thus, it is seen that, when the input signal point $E_v$ with the sign inverted, i.e., $E_v'=-E_v$, is inputted, the original output signal $w_k*E_v$ may be outputted with the sign inverted.

$$w_k*E_v'=w_k*(-E_v)=-(w_k*E_v) \quad (3)$$

In FIG. 12, the second middle code 215 is inputted to the internal look-up table 210-$k$, whereby a sign/rotation eliminated output signal 216 is obtained. The signal is inputted to a sign/rotational correction circuit 213 and then subjected to sign conversion in accordance with the sign/rotational correction signal 218 by utilizing the characteristics of expression (3), whereby an even-sample signal 217 is outputted.

More generally, rotational symmetry can be utilized for simplifying the sub look-up table. If the tap weight is $w_k$, the rotation operation of the phase angle p is $\exp(jp)$, and the input signal point is $E_v'=E_v*\exp(jp)$, the relationship according to expression (4) is obtained.

$$w_k*E_v'=w_k*E_v*\exp(jp)=(w_k*E_v)*\exp(jp) \quad (4)$$

Namely, when the input signal point is rotated about the origin by the angle p, an output signal can be obtained by simply rotating the original output signal by the angle p. By utilizing this relationship, the complex tap product in the case where a multilevel signal with N-fold rotational symmetry is inputted can be efficiently calculated. It is seen that, in view of the fact that the output signal of the sub look-up table has quadrature complex coordinates, 2-fold (the same as the above-described sign inversion), 4-fold, and 8-fold rotational symmetries are relatively easy to implement. This is because these rotational symmetries can be relatively easily implemented by simple switching of the coordinates of the output signal and sign inversion. In the aforementioned cases, the size of the look-up table can be reduced to ½, ¼, and ⅛, respectively, compared with the first embodiment.

The polar coordinate middle code such as used according to the present embodiment is also extremely suitable for utilization of rotational symmetry. For example, when 4-fold rotational symmetry is utilized in the configuration of FIG. 12, by extracting the upper two bits of the phase middle code inputted to the sign/rotation amount decision circuit 211, the two bits can be utilized for detection of rotation in 90° units, i.e., as a decision signal for the first to fourth quadrants. Similarly, when 8-fold rotational symmetry is utilized, the upper three bits may be utilized. Further, when 4-fold rotational symmetry is utilized, in the second middle code encoder 212, four bits combining two bits of an amplitude middle code and the lower two bits of a phase middle code may be used as a new middle code. An implementation of 4-fold rotational symmetry will be described in detail later with reference to QAM signal encoding.

Third Embodiment

A third embodiment of the optical multilevel pre-equalization transmitter will be described. The basic configuration of the present embodiment is also similar to the configuration illustrated in FIG. 7A. The purpose of the present embodiment is also the reduction of circuit size of the middle code pre-equalization circuit 201.

Figures 14, 15A:
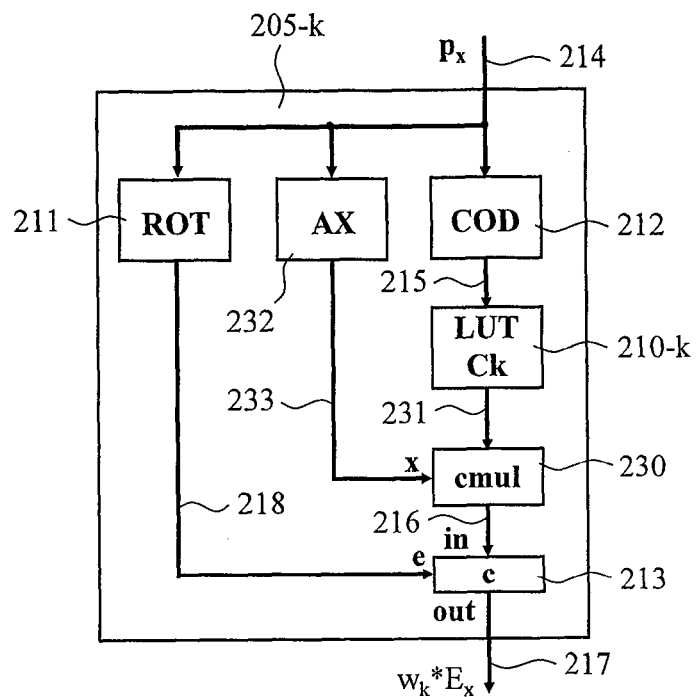
FIG. 14 illustrates a sub look-up table according to a third embodiment.

FIG. 14 illustrates a configuration of a sub look-up table used in the middle code pre-equalization circuit 201 according to the present embodiment. In the configuration of FIG. 14, the even-sample sub look-up table 205-$k$ according to the first embodiment is used as an operation circuit. According to the present embodiment, a further reduction of circuit size is achieved by performing an operation for amplitude information as well.

Thus, the configuration of the even-sample sub look-up table 205-$k$ according to the present embodiment is such that the circuit configuration illustrated in FIG. 12 is provided with an amplitude multiplier setting circuit 232. The amplitude multiplier setting circuit 232 is supplied with 2-bit amplitude information of the input middle code 214, and outputs an amplitude multiplier signal 233 based on the information.

Figure 16A:
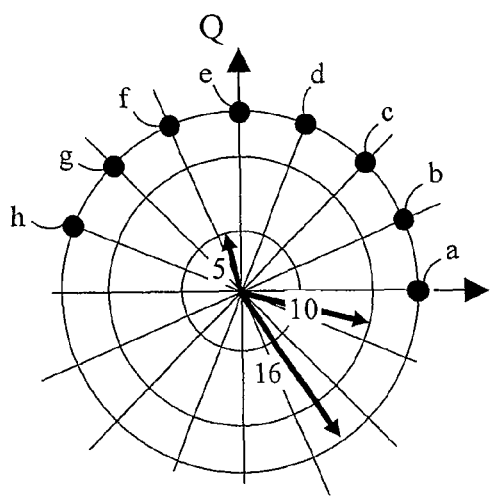

The second middle code encoder 212 extracts the lower three bits of the inputted phase information, and outputs the second middle code 215 such that eight signal points illustrated in FIG. 16A are converted into middle codes a to h. FIG. 16B illustrates a configuration of the internal look-up table 210-$k$ used in the present embodiment. The internal look-up table 210-$k$ includes eight second middle codes as addresses and outputs, in response to the inputted second middle code 215, the result of complex multiplication of a tap stored therein and each signal point as an unsigned amplitude normalization output signal 231.

In FIG. 14, a constant-number multiplier 230 multiplies the inputted unsigned amplitude normalization output signal 231 with a real number value set by the amplitude multiplier signal 233 and outputs the result. Then, the even-sample sub look-up table 205-$k$ performs sign inversion correction in the sign/rotational correction circuit 213, as in the second embodiment, and obtains the even-sample output signal 217.

The circuit size reduction according to the present embodiment requires a small-sized implementation of the constant-number multiplier 230. When a general real number multiplier (such as 8 bits×8 bits) is used as the constant-number multiplier 230, the circuit size will be one half the real number multiplier required for the original complex tap multiplication ($W_k*E_v$). Although a decrease in size can be achieved to some extent, fundamental improvement cannot be obtained.

Figure 15B:
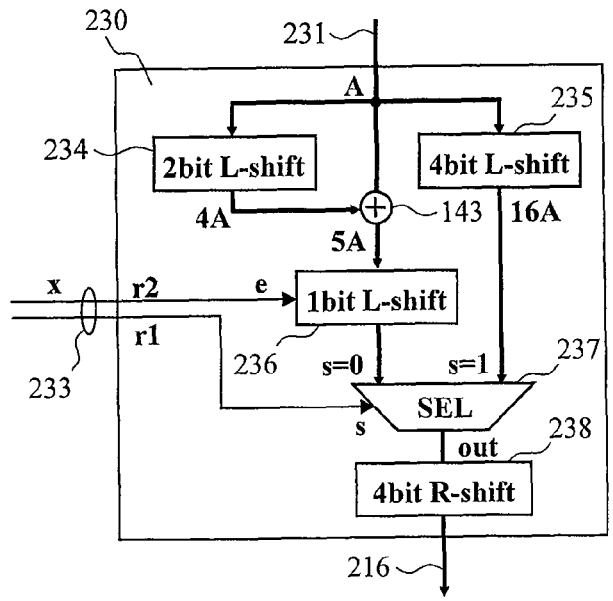
FIG. 15 illustrates an example of a constant number multiplying circuit according to the third embodiment.

FIG. 15 illustrates a configuration such that the amplitude multiplication by the constant-number multiplying circuit 230 can be significantly simplified. FIG. 15A illustrates examples of amplitude multipliers utilized in the constant-number multiplying circuit 230, specifically the amplitude ratios for the inner ring (00), middle (01), and outer ring (10) in the signal constellation of a 16QAM signal. Because the configuration of the multiplying circuit would become complex if the amplitude value is set to be a free digital value, the amplitude ratios of the multilevel signal are set to be 5/16, 10/16, and 16/16 from the inner ring according to the present example, as illustrated in FIG. 16A. The amplitude values are limited to 5 times, 10 times, and 16 times which are constant numbers that can be easily multiplied, with final division by 16, so that the circuit configuration can be simplified. In the constant-number multiplying circuit, two to the Nth power or one over two to the Nth power corresponds to an N-bit shift which can be implemented by simply shifting wire connections without an increase in circuit size. In the example of FIG. 15, this operation approach and an adder are combined so that the three amplitude multiplication results for 5/16, 10/16, and 16/16 can be determined by a very simple configuration.

Namely, in the constant-number multiplying circuit 230 of FIG. 15, the inputted unsigned amplitude normalization output signal 231 is a complex number value A, which is split into three: the first signal from the left is inputted to a 2-bit left bit-shift circuit 234; the second signal is used as is; and the third signal is inputted to a 4-bit left bit-shift circuit 235. Thus, three values of 4A, A, and 16A are obtained.

The complex adder 143 adds 4A and A of the three values to produce 5A, which is inputted to a 1-bit left bit-shift circuit 236. The 1-bit left bit-shift circuit 236 selects the presence or absence of a shift operation in accordance with the lower bit of the amplitude multiplier signal 233 (r2 bit in FIG. 15A). By this selection, two multiplication results of 5A or 10A are obtained.

Thereafter, a selector circuit 237 selects one of the two input signals, i.e., 5A or 10A outputted from the 1-bit left bit-shift circuit 236 and 16A outputted from the 4-bit left bit-shift circuit 235, in accordance with the upper bit of the amplitude constant number signal 233 (r1 in FIG. 15A), and outputs the selected signal.

These values are finally divided by 16 by a 4-bit right bit-shift circuit 238 and then outputted. By this circuit configuration, the constant-number multiplying circuit 230 that performs three types of amplitude multiplication of 5/16 times, 10/16 times, and 16/16 times can be configured in an extremely small gate size.

The types or values of multiplication values that can be implemented in the constant-number multiplying circuit 230 are not limited to the foregoing value. For example, the denominator may be greater than 16, or other values may be selected.

Fourth Embodiment

A fourth embodiment of the optical multilevel pre-equalization transmitter will be described. According to the present embodiment, a pre-equalization circuit is implemented in parallel in a manner different from the combination of circuits illustrated in FIGS. 3 and 11. The present example also represents an implementation in which, as in the circuit configuration illustrated in FIG. 11, the channel response length to be equalized has n symbols and the number of parallels is 80.

Figure 17:
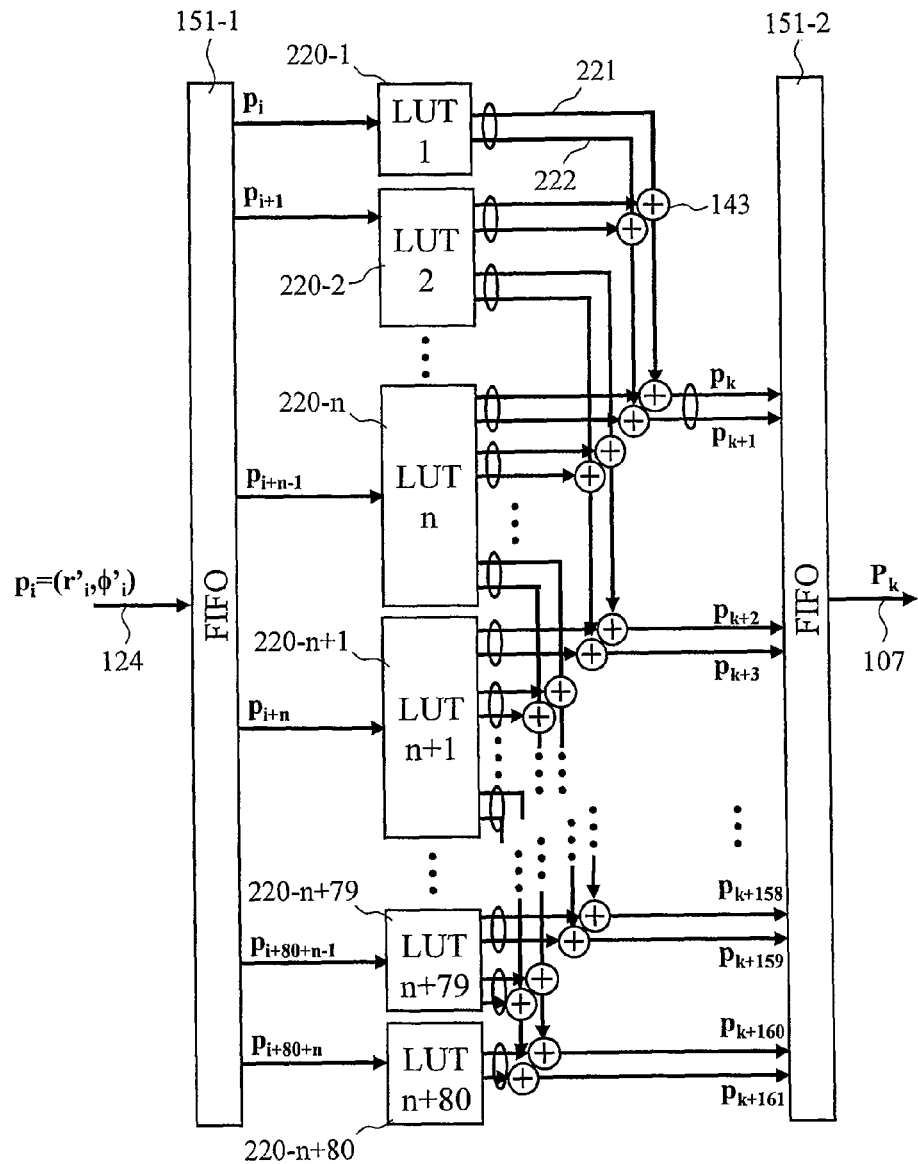
FIG. 17 illustrates a configuration of an optical multilevel signal pre-equalization circuit according to a fourth embodiment.

In FIGS. 3 and 11, each sub look-up table 201-i is supplied with a string of n symbols as an input, and calculates the output field waveform in a certain single symbol time. On the other hand, sub look-up tables 220 illustrated in FIG. 17 are each supplied with a single symbol as an input and output output field waveforms for a plurality of times at once. Thus, the sub look-up tables 220-1 to 220-n+80 output impulse responses with respect to input symbols $p_i$ to $p_{i+80+n}$, respectively.

The inputted middle code 124 after phase pre-integration is inputted to the buffer circuit (FIFO) 151-1. From the buffer circuit 151-1, data of $p_i$ to $p_{i+80+n}$ are read and inputted to 80+n look-up tables of sub look-up tables 220-1(LUT 1) to 220-n+80(LUT n+80) one by one.

FIG. 18 illustrates a configuration of the sub look-up tables 220. In this configuration, a 6-bit middle code after phase pre-integration (2 bits for amplitude and 4 bits for phase) provides an address. For this address, 2n complex data of the number of over-sampling (2 in the present example)*channel response (n in the present example) are stored, which are outputted at once. For example, the data stored at address "101111" (=2f) is the result of multiplication of the signal point $E_{2f}$ with amplitude 10 and phase 1111 and complex impulse responses ($W_1$, $V_1$, $W_2$, $V_2$, ..., $W_k$, $V_k$), i.e., ($W_1*E_{2f}$, $V_1*E_{2f}$, $W_2*E_{2f}$, $V_2*E_{2f}$, ..., $W_n*E_{2f}$, $V_n*E_{2f}$).

An odd-sample complex output signal 221 and an even-sample complex output signal 222 outputted from the sub look-up table 220 are each added by an adder 143 with n responses for middle codes p whose input times are displaced one by one, whereby output samples $p_k$ to $p_{k+161}$ are calculated and written to the output buffer circuit 151-2. By reading the samples in chronological order, a desired parallel operation can be implemented.

Fifth Embodiment

A fifth embodiment of the optical multilevel pre-equalization transmitter will be described. Also according to the present embodiment, a circuit example for reducing the circuit size of the middle code pre-equalization circuit 201 will be described.

Figure 19:
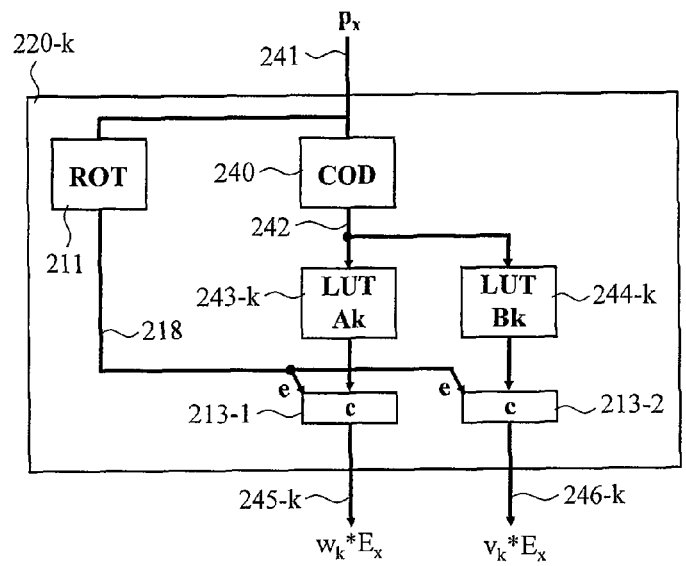
FIG. 19 illustrates sub look-up tables according to a fifth embodiment.

FIG. 19 illustrates a configuration of a sub look-up table 220-k according to the present embodiment. According to the present configuration, the pre-equalization circuit is simplified by converting a general multilevel code, such as represented by the QAM code, into a middle code.

According to the present configuration, a QAM multilevel code 241 inputted to the sub look-up table 220-k is separated into two, of which one is inputted to the sign/rotation amount decision circuit 211 and the other is inputted to a Cartesian coordinate middle code encoder 240.

Figure 20A:
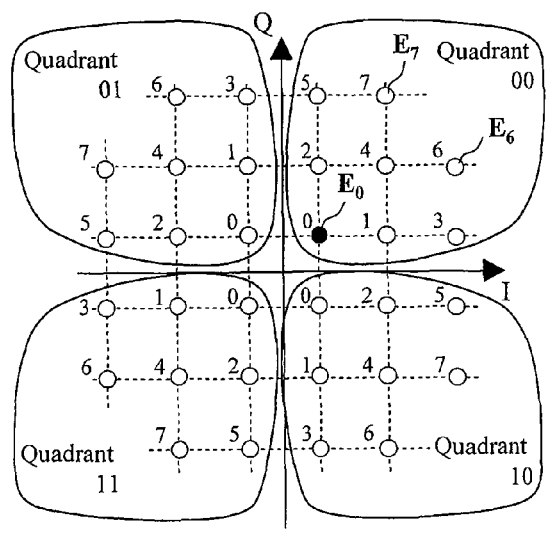
FIG. 20 illustrates a multilevel middle code and an internal look-up table according to the fifth embodiment.

The sign/rotation amount decision circuit 211 is a circuit for detecting the rotational symmetry of the multilevel code, as according to the foregoing embodiment. In the illustrated example, a 4-fold symmetry of the QAM signal is utilized. FIG. 20A illustrates an example of allocation of middle codes of the input multilevel signal. In the present embodiment, it is assumed that the input QAM multilevel code is a 32QAM signal. In this case, the sign/rotation amount decision circuit 211 detects which of four quadrants of a Cartesian coordinate system the signal point of the input signal belongs to, and outputs the detection result as the sign/rotational correction signal 218.

The Cartesian coordinate middle code encoder 240 encodes the signal point positions in the quadrants into a rotational symmetry as illustrated in FIG. 20A, and outputs intra-quadrant middle codes 242 for 0 to 7. The middle codes 0 to 7 in the first to fourth quadrants are arranged in a constellation corresponding to the constellation of the middle codes in the first quadrant rotated by 90° successively. The intra-quadrant middle codes 242 outputted from the Cartesian coordinate middle code encoder 240 is inputted to an even-sample internal look-up table 243-$k$ and an odd-sample internal look-up table 244-$k$.

Figures 20B, 21:
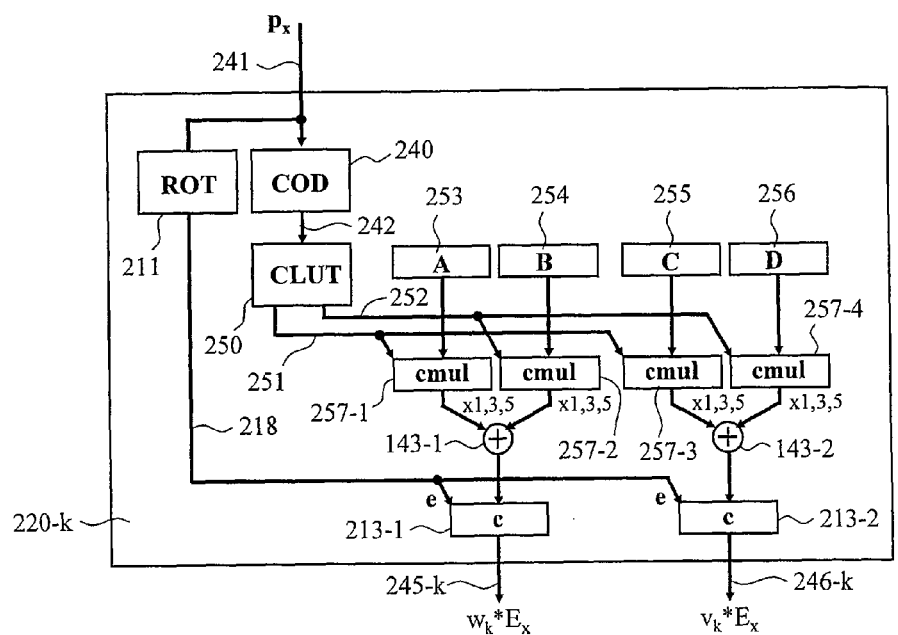
FIG. 21 illustrates a sub look-up table according to a sixth embodiment.

FIG. 20B illustrates a configuration of the even-sample internal look-up table 243 (LUT Ak) of the two internal look-up tables. The LUT Ak utilizes the seven intra-quadrant middle codes 242 as the addresses. In each address, data of the real part and imaginary part of the result of complex multiplication of the weight $W_k$ of a pre-equalization FIR filter and the signal point ($E_0$ to $E_7$) corresponding to each middle code are stored. In this way, complex coordinates as a result of multiplication of $w_k$ and the signal points $E_0$ to $E_7$ in the first quadrant can be obtained in a simpler configuration than a complex multiplier.

The output signals from the even-sample internal look-up table 243-$k$ and the odd-sample internal look-up table 244-$k$ are inputted to a sign/rotational correction circuit 213-1 and 213-2, respectively. The sign/rotational correction circuits 213-1 and 213-2 perform a rotating operation on the output signals from the respective internal look-up tables in 90° units in accordance with the sign/rotational correction signal 218, and outputs the results as an even-sample complex output signal 245 and an odd-sample complex output signal 246, respectively.

As in the case of the previous example, the rotating operation in 90° units can be easily implemented by an exchange of IQ-coordinates and sign inversion of output coordinates. According to the present embodiment, the original signal points to be rotated all belong to the first quadrant. Thus, a 90° rotation can be implemented by an exchange of IQ-coordinate components and sign inversion of I-coordinate components, a 180° rotation can be implemented by complex sign inversion, and a 270° rotation can be implemented by an exchange of IQ-coordinate components and sign inversion of Q-coordinate components.

While the present embodiment is directed to the 32QAM code by way of example, the type of multilevel code as an object is not particular limited. For example, a QAM code of other numbers of multilevels, such as 16 levels or 64 levels, may be used. Further, arbitrary multilevel modulation may be used, including multilevel APSK modulation combining amplitude modulation and phase modulation.

Sixth Embodiment

A sixth embodiment of the optical multilevel pre-equalization transmitter will be described. The present embodiment is also directed to a circuit example for reducing the circuit size of the middle code pre-equalization circuit 201.

FIG. 21 illustrates a configuration of the sub look-up table 220-$k$ according to the present embodiment. The configuration of the sub look-up table 220-$k$ according to the present embodiment is particular suitable for a QAM signal. Namely, in the present example, the intra-quadrant middle codes according to the fifth embodiment are further converted to second middle codes indicating IQ-coordinates so that the circuit size of the sub look-up table can be halved.

With regard to the complex multiplication of the tap weights $W_k$, $v_k$ and the signal point $E_x$ (corresponding to the input middle code $p_x$), when $E_x$ is a QAM signal, and when a certain multilevel signal point $E_0$=(s, s) is used as a reference, the remaining multilevel signals can be expressed as $E_x$=Is+ jQs, where s is the real constant number and I and Q are integer constant numbers. In this case, the result of tap multiplication is expressed by expressions (5) and (6).

$$W_k * E_x = (W_k * s) * I + (jW_k * s) * Q = A * I + B * Q \tag{5}$$

$$V_k * E_x = (v_k * s) * I + (jv_k * s) * Q = C * I + D * Q \tag{6}$$

Namely, by storing the four complex number values of basic complex products A=($W_k$*s), B=(j$W_k$*s), C=($v_k$*s), and D=(j$v_k$*s) in memory, the response in the case where all of the remaining signal points are inputted can be simply calculated by summing the integer multiples of these complex number values according to expressions (5) and (6).

FIG. 21 illustrates a configuration of the even-sample internal look-up table 220-$k$ that utilizes the aforementioned relationship. The inputted QAM multilevel code 241 is split into two of which one is inputted to the sign/rotation amount decision circuit 211 and the other is inputted to the Cartesian coordinate middle code encoder 240. As in the case of the fifth embodiment, the sign/rotation amount decision circuit 211 detects the 4-fold symmetry of the QAM signal. The middle code encoder 240 encodes the signal point positions in each quadrant in the first quadrant as illustrated in FIG. 20, and outputs the intra-quadrant middle codes 242 for 0 to 7.

Figures 22A, 22B:
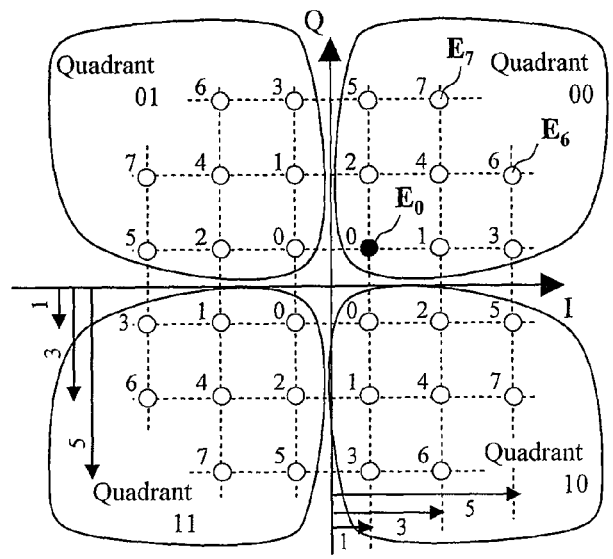
FIGS. 22A and 22B illustrate a multilevel middle code and an internal look-up table according to the sixth embodiment.

FIG. 22A illustrates an example of allocation of the middle codes of the input multilevel signal, which is basically similar to the example of FIG. 20. However, according to the present embodiment, the point $E_0$=(s, s) on the inner-most ring in the first quadrant is used as a reference point and the IQ-coordinates of the remaining points are all arranged at 1, 3, or 5 times $E_0$. Thus, the integer values I and Q in the expressions (5) and (6) take integer values of 1, 3, or 5.

In the configuration of FIG. 21, the intra-quadrant middle code 242 is inputted to a multiplication constant number look-up table (CLUT) 250, and an I-direction multiplication constant number signal 251 (the above integer value I) and a Q-direction multiplication constant number signal 252 (the above integer value Q) are obtained. FIG. 22B illustrates a configuration of the multiplication constant number look-up table (CLUT) 250, in which integer multipliers for the I-direction and the Q-direction corresponding to the respective signal point positions are stored. For example, the signal point $E_7$ illustrated in FIG. 22A which is represented by the middle code 7 has the I-coordinate 3s and the Q-coordinate 5s, so that I=3 and Q=5 are stored in the position for the address 7. The stored data may not necessarily be actual numerical values. For example, three-level digital information that distinguishes among 1, 3, and 5 times (such as 00, 01, and 11) may be stored.

The I-direction multiplication constant number signal 251 and the Q-direction multiplication constant number signal 252 outputted from the multiplication constant number look-up table are supplied to complex constant-number multipliers 257-1 and 257-3 and complex constant-number multipliers 257-2 and 257-4, respectively. The multipliers perform a multiplication operation such that I=1, 3, or 5 times and Q=1, 3, or 5 times. The multipliers are also supplied with an even-sample I-direction basis complex constant number 253, an even-sample Q-direction basis complex constant number 254, an odd-sample I-direction basis complex constant number 255, and an odd-sample Q-direction basis complex constant number 256, as multiplied numbers. In the multipliers, the aforementioned complex numbers A=($W_k$*s), B=(j$W_k$*s), C=($v_k$*s), and D=(j$v_k$*s) are stored. In the present configuration, the complex constant-number multiplier 257-1 calculates A*I, the complex constant-number multiplier 257-2 calculates B*Q, the complex constant-number multiplier 257-3 calculates C*I, and the complex constant-number multiplier 257-2 calculates D*Q.

A complex adder circuit 143-1 outputs the sum of A*I and B*Q. The complex adder circuit 143-2 outputs the sum of C*I and D*Q. Finally, the added output signals are respectively subjected to rotational correction by sign/rotational correction circuits 213-1 and 213-2, whereby a desired even-sample complex output signal 245-$k$ ($W_k^* E_x$) and odd-sample complex output signal 246-$k$ ($v_k^* E_x$) are obtained.

In the above-described embodiment, because B is a simple conversion of A into an imaginary number, the value of B may not necessarily be stored and instead may be calculated by utilizing the value of A. The same applies to C and D. For more general QAM signals, the signal constellation may not necessarily be symmetrical with respect to IQ. In this case, different basis complex constant numbers may be used for I and Q, as in the above configuration. While according to the present embodiment rotational symmetry is utilized jointly for producing a middle code from Cartesian coordinates, a certain reduction of circuit size may be achieved without utilizing rotational symmetry.

Seventh Embodiment

A seventh embodiment of the optical multilevel pre-equalization transmitter will be described. The present embodiment is also directed to a circuit example for reducing the circuit size of the middle code pre-equalization circuit 201.

Figure 23:
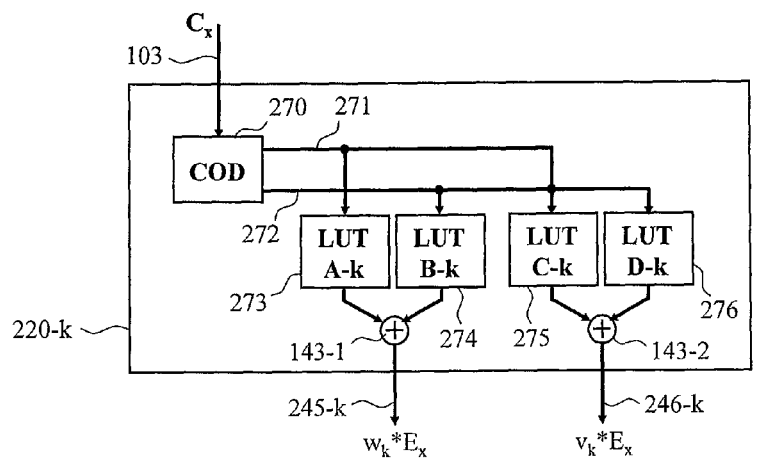
FIG. 23 illustrates sub look-up tables according to a seventh embodiment.

FIG. 23 illustrates a configuration of the sub look-up table 220-$k$. The circuit configuration illustrated in FIG. 23 is a simplified version of the circuit configuration according to the sixth embodiment. An IQ component encoder 270 is supplied with a one-sample/symbol multilevel signal string 103($C_x$). The IQ component encoder 270 outputs an I-component middle code 271 and a Q-component middle code 272 which include values that the I-coordinates and the Q-coordinates of the multilevel signal string 103 may take.

The I-coordinate component middle code 271 used in the present embodiment may be implemented by listing up all of L components (I-coordinate components) that each signal point has, and assigning L middle codes from 0 to L−1, for example. The same applies to the Q-coordinate component middle code 272.

When the multilevel code is a 32QAM signal as illustrated in FIG. 22A, the values that the I-coordinates and the Q-coordinates may take are −5s, −3s, −s, s, 3s, and 5s, and these seven values can be represented by seven middle codes.

Such utilization of middle code is not limited to QAM signals but may be applied for an arbitrary multilevel signal with a signal constellation discretely arranged in a two-dimensional plane. The present embodiment may be applied to a 48-level (three levels for amplitude and 16 levels for phase) signal constellation, as illustrated in FIG. 8A. In this case, the sixteen-level phase-modulated signal points with the three amplitude levels of the inner, middle, and outer rings have nine (I-coordinates of nine signal points $E_{20}$, $E_{21}$, $E_{22}$, ..., $E_{27}$, and $E_{28}$ in the case of the outer-most ring) independent I-coordinates and Q-coordinates in each ring. Because these signal points include the common coordinate value of zero, the number of values that the I-coordinates and the Q-coordinates can each take is generally 25. The technology of the present embodiment is not limited to the original multilevel signal to be transmitted but may also be applied to a middle code representing a phase pre-integrated signal, for example.

The I-coordinate component middle code 271 is inputted to an even-sample I-component look-up table 273 and an odd-sample I-component look-up table 275. The Q-coordinate component middle code 272 is inputted to an even-sample Q-component look-up table 274 and an odd-sample Q-component look-up table 276. Each of the look-up tables for the respective components includes the above-described L addresses, and the product of a tap coefficient and a coordinate value is stored in each address. For example, in the even-sample I-component look-up table 273, the products of the tap multiplier $W_k$ and the I-coordinates for the respective middle codes are stored. In the even-sample Q-component look-up table 274, the products of the tap multiplier $V_k$ and the Q-coordinates for the respective middle codes are stored.

An output from the even-sample I-component look-up table 273 and an output from the even-sample Q-component look-up table 274 are subjected to complex addition by the complex adder 143-1, whereby the even-sample output signal 245-$k$ which is the product of the tap weight $W_k$ and the coordinates $E_x = (I_x, Q_x)$ for the input multilevel signal $C_x$, i.e., $W_k^* E_x = (W_k^* I_x + j W_k^* Q_x)$, can be determined.

Similarly, an output from the odd-sample I-component look-up table 275 and an output from the odd-sample Q-component look-up table 276 are subjected to complex addition by the complex adder 143-2, whereby the odd-sample output signal 246-$k$ which is the product of the tap weight $V_k$ and the coordinate $E_x = (I_x, Q_x)$ of the input multilevel signal $C_x$, i.e., $V_k^* E_x = (W_k^* I_x + j W_k^* Q_x)$, can be determined.

While according to the present embodiment the sign/rotational symmetry is not utilized by way of example, these characteristics may be utilized to reduce circuit size, as in the foregoing embodiment.

Eighth Embodiment

An eighth embodiment of the optical multilevel pre-equalization transmitter will be described. The present embodiment is also directed to a circuit example for reducing the circuit size of the middle code pre-equalization circuit.

Figure 24:
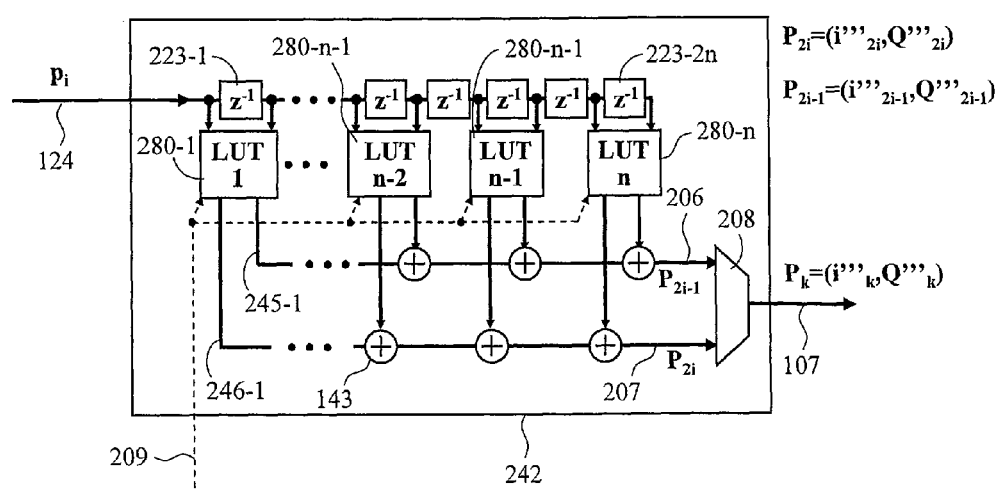
FIG. 24 illustrates an optical multilevel signal pre-equalization circuit according to an eighth embodiment.

FIG. 24 illustrates a configuration of a middle code pre-equalization circuit 242 according to the present embodiment. The middle code pre-equalization circuit 242 according to the present embodiment includes a multi-symbol look-up table to which a plurality of multilevel signals or middle codes is inputted.

According to the present embodiment, the middle code pre-equalization circuit 242 is supplied with the middle code 124 after phase pre-integration. The middle code 124 is delayed by delay circuits 223 (223-1, ..., 223-2$n$) on a symbol by symbol basis. In the case of the present embodiment, successive two middle codes are inputted to multi-symbol sub look-up tables 280 (280-1, ..., 280-$n$) in pairs.

Each of the multi-symbol sub look-up tables 280 includes $M^2$ addresses, where M is the number of states of each middle code, and outputs an even-sample complex output signal 245 (245-1, ..., 245-$n$) and an odd-sample complex output signal 246 (246-1, ..., 246-$n$) for each address. The multi-symbol sub look-up tables 280 may be configured such that the output signal values are complex additions of the output signals from the above-described single-input sub look-up tables with single input.

These output signal values are added with the output signal values from the multi-symbol sub look-up tables for other times by the complex adders 143, as in the case of FIG. 7B, whereby the odd-sample complex output signal 206 and the even-sample complex output signal 207 are produced. The odd-sample complex output signal 206 and the even-sample complex output signal 207 are time-multiplexed by the multiplexing circuit 208 alternately, and are outputted as the multilevel signal 107 after pre-equalization.

Thus, the input signal to the look-up tables is not necessarily limited to a single middle code or multilevel symbol, but a plurality of middle codes or multilevel symbols with different times may be inputted.

Conclusion

Finally, the embodiments described above will be summarized. As described above, by using look-up tables to which a middle code is inputted and a complex operation circuit in combination, the number of states of the signal inputted to each look-up table can be greatly decreased, so that the required size of the look-up tables (namely, the size of the pre-equalization circuit) can be greatly reduced.

For example, when an optical multilevel signal or middle code using polar coordinates is used as the input, by inputting these signals to the look-up tables as is, the conversion circuit for converting the polar coordinates into Cartesian coordinates can be omitted, whereby the effect of reducing the circuit size can be much increased. This effect is particularly effective when a phase pre-integration operation is performed on the transmitting side because the phase pre-integration operation is an operation involving the extraction and cumulative addition of only the phase component on a symbol by symbol basis on the transmitting side and therefore polar coordinates can be easily implemented.

By converting a middle code or a multilevel signal to be transmitted into a middle code on the basis of complex symmetry thereof and inputting the middle code into a look-up table, and applying symmetry correction to an output therefrom, the look-up table can be reduced for symmetry. Thus, a significant effect of reducing circuit size/power consumption can be obtained. Examples of the symmetry correction include an N-fold rotational symmetry operation, such as complex sign inversion (2-fold rotational symmetry) and 4-fold rotational symmetry, whereby the effect of reducing the size of the look-up table to 1/N can be obtained.

When a QAM signal is used as an information signal, the values that the I-coordinate component and the Q-coordinate component may possibly take may be converted into middle codes which are inputted to a look-up table, and a response component obtained from the look-up table may be inputted to a coordinates operation circuit so as to obtain a pre-equalized waveform, whereby the effect of further reduction of circuit size can be obtained.

By simultaneously implementing a plurality of functions, such as over-sampling involving interpolation of a waveform over time, pre-equalization of chromatic dispersion on the transmitting side, and optical spectrum narrowing, as the functions of the pre-equalization circuit, the effect of significantly reducing the circuit size required for signal processing can be obtained.

Other Embodiments

The foregoing detailed description has been presented for the purposes of illustration and description. Many modifications and variations are possible in light of the above teaching. It is not intended to be exhaustive or to limit the subject matter described herein to the precise form disclosed. For example, part of the configuration of one embodiment may be substituted by the configuration of another embodiment, or the configuration of one embodiment may be incorporated into the configuration of another embodiment. Further, with respect to part of the configuration of each embodiment, addition, deletion, or substitution may be made on the basis of another configuration.

The configurations, functions, process units, process means and the like may be partly or entirely implemented in the form of an integrated circuit or other hardware. The configurations, functions and the like may be implemented by a processor interpreting and executing a program for implementing the functions, i.e., in the form of software. Information about the program for implementing the functions, a table, a file and the like may be stored in a storage apparatus such as a memory, a hard disk, or a SSD (Solid State Drive), or a storage medium such as an IC card, an SD card, or a DVD.

The illustrated control lines and information lines are those considered necessary for illustration purposes, and do not represent all of the control lines or information lines required in a product. It may be considered that in fact almost all of the elements or configurations are mutually connected.

INDUSTRIAL APPLICABILITY

The present invention may be applied to an optical multilevel transmitter such that a digital pre-equalization process is performed on the transmitting side for linear transmission impairment or spectral narrowing due to the influence of chromatic dispersion of an optical signal, for example. The invention may also be applied to an optical transmitter-receiver that receives an optical multilevel signal from such transmitter via optical fiber transmission.

REFERENCE SIGNS LIST

101: Information signal
107: Multilevel signal after pre-equalization (2sps, quadrature digital value representation)
108: Linear response compensating circuit
109: Non-linear response compensating circuit
111: Analog modulation signal
112: Drive amplifier
113: Laser source
114: CW (continuous wave) laser source
115: IQ optical (field) modulator
116: Output optical fiber
121: Encoder using middle polar coordinate code
122: Polar coordinate multilevel middle code (the number of amplitude states N, the number of phase states M)
123: Phase pre-integration circuit
124: Middle code after phase pre-integration (the number of amplitude states N, the number of phase states M)
127: Optical multilevel signal that has been subjected to phase pre-integration and chromatic dispersion pre-equalization
200: Optical multilevel transmitter signal processing circuit
201: Middle code pre-equalization circuit
202: Odd-sample calculation circuit
203: Even-sample calculation circuit
204: Odd-sample sub look-up table
205: Even-sample sub look-up table
206: Odd-sample complex output signal
207: Even-sample complex output signal
208: Multiplexing circuit
209: Table renewal data signal
210: Internal look-up table
211: Sign/rotation amount decision circuit
212: Second middle code encoder
213: Sign/rotational correction circuit
214: Input middle code
215: Second middle code
216: Sign/rotation eliminated output signal
217: Even-sample output signal 218: Sign/rotational correction signal
220: Sub look-up table
221: Odd-sample complex output signal
222: Even-sample complex output signal
230: Constant-number multiplier
231: Unsigned amplitude normalization output signal
232: Amplitude multiplier setting circuit
233: Amplitude multiplier signal
234: 2-bit left bit-shift circuit
235: 4-bit left bit-shift circuit
236: 1-bit left bit-shift selection circuit
237: Selector circuit
238: 4-bit right bit-shift circuit
240: Cartesian coordinate middle code encoder
241: QAM multilevel code
242: Intra-quadrant middle code
243: Even-sample internal look-up table
244: Odd-sample internal look-up table
245: Even-sample complex output signal
246: Odd-sample complex output signal
250: Multiplication constant number look-up table
251: I-direction multiplication constant number signal
252: Q-direction multiplication constant number signal
253: Even-sample I-direction basis complex constant number
254: Even-sample Q-direction basis complex constant number
255: Odd-sample I-direction basis complex constant number
256: Odd-sample Q-direction basis complex constant number
257: Complex constant-number multiplier
270: IQ component encoder
271: I-component middle code
272: Q-component middle code
273: Even-sample I-component look-up table
274: Even-sample Q-component look-up table
275: Odd-sample I-component look-up table
276: Odd-sample Q-component look-up table
280: Multi-symbol sub look-up table
300: Optical pre-equalization transmitter
301: Optical amplifier
302: Optical fiber transmission path
303: Incoherent optical field receiver
304: Reception optical field signal
305: Optical splitter
306: Optical delay detector
307: Optical intensity detector
308: Balanced optical receiver
309: AD converter
310: Inverse tangential operation circuit
311: Square-root circuit
312: Cartesian coordinate conversion circuit
313: Multilevel decision circuit
314: Output information signal
320: Polarization multiplexed optical pre-equalization transmitter
321: Separation circuit
322: X-polarization information signal
323: Y-polarization information signal
324: Optical multilevel signal that has been subjected to X-polarization phase pre-integration and chromatic dispersion pre-equalization
325: Optical multilevel signal that has been subjected to Y-polarization phase pre-integration and chromatic dispersion pre-equalization
326: Polarization multiplexer
327: Polarization multiplexed optical multilevel signal
328: Polarization multiplexed reception multilevel signal
330: Polarization diversity coherent optical receiver using digital delay detection
331: Local laser source
332: Balanced optical receiver
333: AD converter
334: Polarization-diversity optical 90-deg. hybrid circuit
335: Polarization-diversity frequency/phase estimation circuit
336: Multilevel signal decision circuit
337: Digital delay detection circuit
338: Phase difference operation circuit
340: S-polarization component of reception optical signal and local light
341: P-polarization component of reception optical signal and local light
342: Polarization multiplexed optical pre-equalization transmitter-receiver (transponder) according to embodiment

What is claimed is:

1. An optical multilevel signal pre-equalization circuit comprising:
a middle code conversion circuit that converts an input one of a plurality of first middle codes based on symmetry of a constellation of multilevel signals of a multilevel code into one of a plurality of second middle codes from which symmetry is eliminated, the input one of the first middle codes corresponding to one of the multilevel signals which is to be transmitted;
a look-up table in which a plurality of waveform response components are stored in association with the plurality of second middle codes;
a symmetry correction operation circuit which corrects the waveform response components from the look-up table which are associated with the converted one of the second middle codes based on the input one of the first middle codes, and outputs corrected waveform response components; and
one or more operation circuits to which the corrected waveform response components are input from the symmetry correction operation circuit, and which output a pre-equalized output waveform corresponding to the one of the multilevel signals to be transmitted,
wherein the first middle codes and the second middle codes are bit strings.

2. The optical multilevel signal pre-equalization circuit according to claim 1, wherein the first middle codes are polar coordinate middle codes combining an amplitude component and a phase component.

3. The optical multilevel signal pre-equalization circuit according to claim 1, wherein the first middle codes include a phase component of the one of the multilevel signals to be transmitted which is integrated on a symbol by symbol basis.

4. The optical multilevel signal pre-equalization circuit according to claim 1, wherein the symmetry is an N-fold (N is a natural number of 2 or more) rotational symmetry.

5. The optical multilevel signal pre-equalization circuit according to claim 1, wherein the middle code conversion circuit is a Cartesian coordinate middle code conversion circuit that outputs the converted one of the second middle codes to indicate an I-coordinate component and a Q-coordinate component of the one of the multilevel signals to be transmitted.

6. The optical multilevel signal pre-equalization circuit according to claim 1, wherein the waveform response components are interpolated over time.

7. The optical multilevel signal pre-equalization circuit according to claim 1 wherein the waveform response components of the look-up table are set for pre-equalization of a transfer function of chromatic dispersion of an optical fiber transmission path on a transmitting side.

8. An optical multilevel pre-equalization transmitter comprising:
- a middle code conversion circuit that converts an input one of a plurality of first middle codes based on symmetry of a constellation of multilevel signals of a multilevel code into one of a plurality of second middle codes from which symmetry is eliminated, the input one of the first middle codes corresponding to one of the multilevel signals which is to be transmitted;
- a look-up table in which a plurality of waveform response components are stored in association with the plurality of second middle codes;
- a symmetry correction operation circuit which corrects the waveform response components from the look-up table which are associated with the converted one of the second middle codes based on the input one of the first middle codes, and outputs corrected waveform response components;
- one or more operation circuits to which the corrected waveform response components are input from the symmetry correction operation circuit, and which output a pre-equalized output waveform corresponding to the one of the multilevel signals to be transmitted; and
- an optical field modulator that outputs the pre-equalized waveform outputted from the optical multilevel signal pre-equalization circuit after conversion into a complex optical field,
- wherein the first middle codes and the second middle codes are bit strings.

9. The optical multilevel signal pre-equalization circuit according to claim 8,
- wherein the first middle codes are polar coordinate middle codes combining an amplitude component and a phase component.

10. A polarization multiplexed optical pre-equalization transmitter comprising:
- a first optical multilevel pre-equalization transmitter and a second optical multilevel pre-equalization transmitter, each including:
- a middle code conversion circuit that converts an input one of a plurality of first middle codes based on symmetry of a constellation of multilevel signals of a multilevel code into one of a plurality of second middle codes from which symmetry is eliminated, the input one of the first middle codes corresponding to one of the multilevel signals which is to be transmitted,
- a look-up table in which a plurality of waveform response components are stored in association with the plurality of second middle codes,
- a symmetry correction operation circuit which corrects the waveform response components from the look-up table which are associated with the converted one of the second middle codes based on the input one of the first middle codes, and outputs corrected waveform response components,
- one or more operation circuits to which the corrected waveform response components are input from the symmetry correction operation circuit, and which output a pre-equalized output waveform corresponding to the one of the multilevel signals to be transmitted, and
- a polarization multiplexer that outputs optical signals outputted from the first and second optical multilevel pre-equalization transmitters after polarization multiplexing or polarization encoding,
- wherein the first middle codes and the second middle codes are bit strings.

11. The optical multilevel signal pre-equalization circuit according to claim 10,
- wherein the first middle codes are polar coordinate middle codes combining an amplitude component and a phase component.

* * * * *